(12) United States Patent
Jones

(10) Patent No.: US 10,805,761 B2
(45) Date of Patent: *Oct. 13, 2020

(54) GLOBAL REGISTRATION SYSTEM FOR AERIAL VEHICLES

(71) Applicant: GeoFrenzy, Inc., Tiburon, CA (US)

(72) Inventor: Benjamin T. Jones, Henderson, NV (US)

(73) Assignee: GEOFRENZY, INC., Tiburon, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 16/033,525

(22) Filed: Jul. 12, 2018

(65) Prior Publication Data

US 2018/0324546 A1 Nov. 8, 2018

Related U.S. Application Data

(63) Continuation-in-part of application No. 15/987,477, filed on May 23, 2018, now Pat. No. 10,694,318, (Continued)

(51) Int. Cl.
*H04W 4/021* (2018.01)
*G08G 5/00* (2006.01)
(Continued)

(52) U.S. Cl.
CPC ........... *H04W 4/021* (2013.01); *B64C 39/024* (2013.01); *G01C 21/28* (2013.01); *G06F 16/29* (2019.01);
(Continued)

(58) Field of Classification Search
CPC ......... H04L 12/2816; H04L 2012/2841; H04L 67/125; H04M 1/72533; H04M 1/72572; H04W 4/021
See application file for complete search history.

(56) References Cited

U.S. PATENT DOCUMENTS 6,844,990 B2 1/2005 Artonne et al.
6,865,028 B2 3/2005 Moustier et al.
(Continued)

OTHER PUBLICATIONS

Christian Maihofer, "A Survey of Geocast Routing Protocols," IEEE Communications Surveys Second Quarter 2004, vol. 6, No. 2, pp. 32-42 (2004).
(Continued)

*Primary Examiner* — Hitesh Patel
(74) *Attorney, Agent, or Firm* — NEO IP

(57) ABSTRACT

Systems and methods for aerial vehicle registration are disclosed. A server computer and at least one database are constructed and configured for network communication with at least one aerial vehicle. The at least one aerial vehicle transmits a registration request to the server computer. The server computer assigns a unique registration ID for the at least one aerial vehicle. The at least one database comprises a geofence database storing information of a multiplicity of registered geofences. Each of the multiplicity of registered geofences comprises a plurality of geographic designators defined by a plurality of unique Internet Protocol version 6 (IPv6) addresses. One of the plurality of unique IPv6 addresses is encoded as a unique identifier for each of the multiplicity of registered geofences. The server computer caches the information of the multiplicity of registered geofences on the at least one aerial vehicle.

17 Claims, 12 Drawing Sheets

Related U.S. Application Data which is a continuation of application No. 15/225,433, filed on Aug. 1, 2016, now Pat. No. 9,986,378, which is a continuation-in-part of application No. 15/213,072, filed on Jul. 18, 2016, now Pat. No. 10,115,277, which is a continuation-in-part of application No. 15/007,661, filed on Jan. 27, 2016, now Pat. No. 9,396,344, which is a continuation of application No. 14/740,557, filed on Jun. 16, 2015, now Pat. No. 9,280,559, which is a continuation of application No. 14/728,259, filed on Jun. 2, 2015, now Pat. No. 9,363,638, said application No. 15/213,072 is a continuation-in-part of application No. 14/953,485, filed on Nov. 30, 2015, now Pat. No. 9,875,251, which is a continuation-in-part of application No. 14/745,951, filed on Jun. 22, 2015, now Pat. No. 9,906,609, which is a continuation-in-part of application No. 14/728,259, filed on Jun. 2, 2015, now Pat. No. 9,363,638, which is a continuation-in-part of application No. 14/811,234, filed on Jul. 28, 2015, now Pat. No. 10,121,215, which is a continuation-in-part of application No. 14/755,669, filed on Jun. 30, 2015, now Pat. No. 9,906,902, which is a continuation-in-part of application No. 14/745,951, filed on Jun. 22, 2015, now Pat. No. 9,906,609, which is a continuation-in-part of application No. 14/728,259, filed on Jun. 2, 2015, now Pat. No. 9,363,638, said application No. 14/811,234 is a continuation-in-part of application No. 14/728,259, filed on Jun. 2, 2015, now Pat. No. 9,363,638, and a continuation-in-part of application No. 14/740,557, filed on Jun. 16, 2015, now Pat. No. 9,280,559, which is a continuation of application No. 14/728,259, filed on Jun. 2, 2015, now Pat. No. 9,363,638, said application No. 14/811,234 is a continuation-in-part of application No. 14/745,951, filed on Jun. 22, 2015, now Pat. No. 9,906,609, which is a continuation-in-part of application No. 14/728,259, filed on Jun. 2, 2015, now Pat. No. 9,363,638, said application No. 15/225,433 is a continuation-in-part of application No. 15/170,619, filed on Jun. 1, 2016, now Pat. No. 9,491,577, which is a continuation of application No. 14/728,259, filed on Jun. 2, 2015, now Pat. No. 9,363,638, said application No. 14/755,669 is a continuation-in-part of application No. 14/728,259, filed on Jun. 2, 2015, now Pat. No. 9,363,638.

(60) Provisional application No. 62/532,675, filed on Jul. 14, 2017.

(51) Int. Cl.

| | | |
|---|---|---|
| *G06F 21/60* | (2013.01) | |
| *H04L 29/08* | (2006.01) | |
| *B64C 39/02* | (2006.01) | |
| *H04W 68/00* | (2009.01) | |
| *H04W 12/08* | (2009.01) | |
| *H04L 12/28* | (2006.01) | |
| *H04L 12/403* | (2006.01) | |
| *G06F 16/29* | (2019.01) | |
| *G06F 16/951* | (2019.01) | |
| *G06F 21/44* | (2013.01) | |
| *G01C 21/28* | (2006.01) | |
| *G08G 5/04* | (2006.01) | |
| *H04L 29/12* | (2006.01) | |
| *G08B 21/24* | (2006.01) | |
| *H04W 80/04* | (2009.01) | |
| *H04W 12/00* | (2009.01) | |
| *H04L 29/06* | (2006.01) | |

(52) U.S. Cl.
CPC ............ *G06F 16/951* (2019.01); *G06F 21/44* (2013.01); *G06F 21/604* (2013.01); *G08G 5/006* (2013.01); *G08G 5/0008* (2013.01); *G08G 5/0013* (2013.01); *G08G 5/0021* (2013.01); *G08G 5/0034* (2013.01); *G08G 5/0069* (2013.01); *G08G 5/045* (2013.01); *H04L 12/2816* (2013.01); *H04L 12/403* (2013.01); *H04L 67/02* (2013.01); *H04L 67/141* (2013.01); *H04L 67/18* (2013.01); *H04L 67/2814* (2013.01); *H04W 12/08* (2013.01); *H04W 68/00* (2013.01); *B64C 2201/145* (2013.01); *G08B 21/24* (2013.01); *H04L 61/1511* (2013.01); *H04L 61/2007* (2013.01); *H04L 61/609* (2013.01); *H04L 61/6059* (2013.01); *H04L 63/0428* (2013.01); *H04L 63/107* (2013.01); *H04W 12/001* (2019.01); *H04W 12/00503* (2019.01); *H04W 80/04* (2013.01)

(56) References Cited

U.S. PATENT DOCUMENTS

| | | |
|---|---|---|
| 6,885,817 B2 | 4/2005 | Artonne et al. |
| 6,895,180 B2 | 5/2005 | Artonne et al. |
| 6,920,129 B2 | 7/2005 | Preston et al. |
| 7,498,985 B1 | 3/2009 | Woo et al. |
| 7,525,933 B1 | 4/2009 | Hall |
| 7,613,467 B2 | 11/2009 | Fleischman |
| 7,865,416 B1 | 1/2011 | Graff et al. |
| 8,016,426 B2 | 9/2011 | Artonne et al. |
| 8,052,081 B2 | 11/2011 | Olm et al. |
| 8,103,567 B1 | 1/2012 | Graff et al. |
| 8,149,801 B2 | 4/2012 | Hall |
| 8,285,628 B1 | 10/2012 | Graff et al. |
| 8,292,215 B2 | 10/2012 | Olm et al. |
| 8,346,578 B1 | 1/2013 | Hopkins et al. |
| 8,483,652 B2 | 7/2013 | Hall |
| 8,493,207 B2 | 7/2013 | Diem |
| 8,510,190 B1 | 8/2013 | Graff et al. |
| 8,582,724 B2 | 11/2013 | Olshansky et al. |
| 8,588,818 B2 | 11/2013 | Huang et al. |
| 8,634,804 B2 | 1/2014 | McNamara et al. |
| 8,717,166 B2 | 5/2014 | Diem |
| 8,718,598 B2 | 5/2014 | Johnson |
| 8,753,155 B2 | 6/2014 | Olm et al. |
| 8,812,027 B2 | 8/2014 | Obermeyer et al. |
| 8,832,293 B2 | 9/2014 | Wang |
| 8,837,363 B2 | 9/2014 | Jones et al. |
| 8,880,101 B2 | 11/2014 | Fraccaroli |
| 8,897,741 B2 | 11/2014 | Johnson |
| 8,918,075 B2 | 12/2014 | Maier et al. |
| 8,938,201 B2 | 1/2015 | Boulton |
| 8,971,930 B2 | 3/2015 | Li et al. |
| 8,990,356 B2 | 3/2015 | Mcpherson et al. |
| 8,991,740 B2 | 3/2015 | Olm et al. |
| 9,071,931 B2 | 6/2015 | Diem |
| 9,280,559 B1 | 3/2016 | Jones |
| 9,363,638 B1 | 6/2016 | Jones |
| 9,491,577 B1 | 11/2016 | Jones |
| 9,875,251 B2 | 1/2018 | Jones |
| 9,906,609 B2 | 2/2018 | Jones |
| 9,906,902 B2 | 2/2018 | Jones |
| 2001/0015965 A1 | 8/2001 | Preston et al. |
| 2002/0035432 A1 | 3/2002 | Kubica et al. |
| 2003/0036949 A1 | 2/2003 | Kaddeche et al. |
| 2004/0148294 A1 | 7/2004 | Wilkie et al. |
| 2005/0203768 A1 | 9/2005 | Florance et al. |
| 2007/0220038 A1 | 9/2007 | Crago |
| 2008/0291318 A1 | 11/2008 | Artonne et al. |

(56) References Cited

U.S. PATENT DOCUMENTS

| | | |
|---|---|---|
| 2010/0044499 A1 | 2/2010 | Dragan et al. |
| 2010/0198714 A1 | 8/2010 | Orfano |
| 2011/0105151 A1 | 5/2011 | Hall |
| 2011/0136468 A1 | 6/2011 | McNamara et al. |
| 2011/0208797 A1 | 8/2011 | Kim |
| 2012/0102489 A1 | 4/2012 | Staiman et al. |
| 2012/0172027 A1* | 7/2012 | Partheesh ........... H04L 12/2816 455/420 |
| 2012/0265685 A1* | 10/2012 | Brudnicki ............... H04W 4/02 705/44 |
| 2013/0091016 A1 | 4/2013 | Shutter |
| 2013/0097046 A1 | 4/2013 | Krishnamurthy et al. |
| 2013/0225196 A1 | 8/2013 | James et al. |
| 2013/0267196 A1 | 10/2013 | Leemet et al. |
| 2013/0314398 A1 | 11/2013 | Coates et al. |
| 2014/0006951 A1 | 1/2014 | Hunter |
| 2014/0057648 A1 | 2/2014 | Lyman et al. |
| 2014/0100900 A1 | 4/2014 | Abhyanker |
| 2014/0171013 A1 | 6/2014 | Varoglu et al. |
| 2014/0208397 A1 | 7/2014 | Peterson |
| 2014/0248887 A1 | 9/2014 | Alkabra et al. |
| 2014/0282829 A1 | 9/2014 | Dabbiere et al. |
| 2014/0295944 A1 | 10/2014 | Faircloth |
| 2014/0335823 A1 | 11/2014 | Heredia et al. |
| 2014/0339355 A1 | 11/2014 | Olm et al. |
| 2014/0340473 A1 | 11/2014 | Artonne |
| 2015/0031398 A1* | 1/2015 | Rahnama ............. H04L 61/303 455/456.3 |
| 2015/0087263 A1 | 3/2015 | Branscomb |
| 2015/0099461 A1 | 4/2015 | Holden et al. |
| 2015/0172862 A1 | 6/2015 | Kau et al. |
| 2015/0281507 A1 | 10/2015 | Konen et al. |
| 2016/0007156 A1 | 1/2016 | Chiou et al. |
| 2016/0035054 A1 | 2/2016 | Branscomb et al. |
| 2016/0073225 A1 | 3/2016 | Ganesalingam et al. |
| 2016/0169696 A1 | 6/2016 | Butts et al. |
| 2016/0203522 A1 | 7/2016 | Shiffert et al. |
| 2016/0323241 A1 | 11/2016 | Jones et al. |
| 2016/0358432 A1 | 12/2016 | Branscomb et al. |
| 2017/0150308 A1 | 5/2017 | Jones |
| 2017/0230791 A1 | 8/2017 | Jones |
| 2017/0238129 A1 | 8/2017 | Maier et al. |
| 2017/0249712 A1 | 8/2017 | Branscomb et al. |

OTHER PUBLICATIONS

Robert Barr, What 3 Words, Mar. 2015, v1.1, LYMM, Cheshire, UK.

* cited by examiner

Zoom Level to Class Binding when using a pyramid projection.

3d model overview

GLOBAL REGISTRATION SYSTEM FOR AERIAL VEHICLES

CROSS-REFERENCES TO RELATED APPLICATIONS

The application is related to and claims priority from the following U.S. Patent Applications. This application claims priority from U.S. Provisional Patent Application No. 62/532,675 filed Jul. 14, 2017. This application is also a continuation-in-part of U.S. patent application Ser. No. 15/987,477 filed May 23, 2018, which is a continuation of U.S. patent application Ser. No. 15/225,433 filed Aug. 1, 2016 and issued as U.S. Pat. No. 9,986,378. U.S. patent application Ser. No. 15/225,433 is a continuation-in-part of U.S. patent application Ser. No. 15/170,619 filed Jun. 1, 2016, which is a continuation of U.S. patent application Ser. No. 14/728,259 filed Jun. 2, 2015 and issued as U.S. Pat. No. 9,363,638. U.S. patent application Ser. No. 15/225,433 is also a continuation-in-part of U.S. patent application Ser. No. 15/213,072 filed Jul. 18, 2016. U.S. patent application Ser. No. 15/213,072 is a continuation-in-part of U.S. patent application Ser. No. 14/811,234 filed Jul. 28, 2015, which claims priority from U.S. Provisional Application No. 62/030,252 filed Jul. 29, 2014. U.S. patent application Ser. No. 14/811,234 is a continuation-in-part of U.S. application Ser. No. 14/740,557 filed Jun. 16, 2015 and issued as U.S. Pat. No. 9,280,559, which is a continuation of U.S. application Ser. No. 14/728,259 filed Jun. 2, 2015 and issued as U.S. Pat. No. 9,363,638. U.S. patent application Ser. No. 14/811,234 is also continuation-in-part of U.S. application Ser. No. 14/755,669 filed Jun. 30, 2015 and issued as U.S. Pat. No. 9,906,902, which is a continuation-in-part of U.S. application Ser. No. 14/745,951 filed Jun. 22, 2015 and issued as U.S. Pat. No. 9,906,609, which is a continuation-in-part of U.S. application Ser. No. 14/728,259 filed Jun. 2, 2015 and issued as U.S. Pat. No. 9,363,638. U.S. application Ser. No. 14/755,669 is also a continuation-in-part of U.S. application Ser. No. 14/728,259 filed Jun. 2, 2015 and issued as U.S. Pat. No. 9,363,638. U.S. patent application Ser. No. 14/811,234 is also a continuation-in-part of U.S. application Ser. No. 14/745,951 filed Jun. 22, 2015 and issued as U.S. Pat. No. 9,906,609, which is a continuation-in-part of U.S. application Ser. No. 14/728,259 filed Jun. 2, 2015 and issued as U.S. Pat. No. 9,363,638. U.S. patent application Ser. No. 14/811,234 is a continuation-in-part of U.S. application Ser. No. 14/728,259 filed Jun. 2, 2015 and issued as U.S. Pat. No. 9,363,638. U.S. patent application Ser. No. 15/213,072 is also a continuation-in-part of U.S. patent application Ser. No. 14/953,485 filed Nov. 30, 2015, which is a continuation in-part-of U.S. patent application Ser. No. 14/745,951 filed Jun. 22, 2015 and issued as U.S. Pat. No. 9,906,609, which is a continuation in-part-of U.S. patent application Ser. No. 14/728,259 filed Jun. 2, 2015 issued as U.S. Pat. No. 9,363,638. U.S. patent application Ser. No. 15/213,072 is also a continuation-in-part of U.S. patent application Ser. No. 15/007,661 filed Jan. 27, 2016, which is a continuation of U.S. patent Ser. No. 14/740,557 filed Jun. 16, 2015 and issued as U.S. Pat. No. 9,280,559, which is a continuation of U.S. patent application Ser. No. 14/728,259 filed Jun. 2, 2015 and issued as U.S. Pat. No. 9,363,638. Each of the above listed priority documents is incorporated herein by reference in its entirety.

BACKGROUND OF THE INVENTION

1. Field of the Invention

The present invention relates generally to aerial vehicle registration.

2. Description of the Prior Art

Systems, methods, and devices for creating databases of land are well-known in the prior art. It is also known to have an IP address associated with a general location, such as a city or zip code. Furthermore, location-based beacon technologies have entered the mass markets providing geo-location and enabling of portable wireless devices for venue and in-store customer marketing, sales and CRM services. Real estate ownership and the management of business services within the constraints of the business space, like a mall or convention center, has become open game for outside competitive customer poaching and other kinds of interference. Furthermore, geo-fencing could address other contentious applications and their use, such as texting while driving. Ubiquitous smartphone usage and location based mobile marketing and communication have become prevalent in today's society. With 1.75 billion smartphone users in 2014 and 85% of the top 100 retailers estimated to be using beacon technology by 2016, opportunities for determining the interactions of the smartphones, beacons, and the Internet generally within defined spaces are numerous.

Exemplary US Patent documents in the prior art include:

U.S. Pub. No. 2015/0031398 for "Zone-Based Information Linking Systems and Methods" by Rahnama, filed Jul. 29, 2015 and published Jan. 29, 2015, describes a method of linking to a geo-fenced zone, the method comprising: configuring a device to operate as a document processing engine according to zone address identification rules; obtaining, by the document processing engine, a digital document; identifying, by the document processing engine, at least one zone address token in the digital document according to the zone address identification rules; resolving the at least one zone address token to a network address related to a target zone; and enabling the device to link communicatively to the target zone according to the network address.

U.S. Pub. No. 2002/0035432 for "Method and system for spatially indexing land" by Kubica, filed Jun. 8, 2001 and published May 31, 2007, describes a method of spatially indexing land by selecting a parcel (100) of land and extending its boundaries (110) to include a portion of adjacent streets (125) and alleys (122) to define a cell (150). A unique identifier is assigned to the cell as well as a reference point (170) within the cell (150). The reference point has a known location in a global referencing system. An internet address is assigned to the cell which identifies its location, such as the location of the reference point within the cell. This information and other data associated with the cell is then stored in an OX Spatial Index database and includes the street address for the cell and other relevant information such as owner, what type building if any is on the property, location of utility lines, etc. A Spatial Internet Address which includes the geographic location of the cell is assigned for each cell and this information is also stored in the index. The index thereby created can be used for various applications such as determining a user's location and locating geographically relevant information by searching the index and connecting to web sites associated with the user's vicinity.

U.S. Pat. No. 6,920,129 for "Geo-spatial internet protocol addressing" by Preston, filed Nov. 30, 2000 and issued Jul. 19, 2005, describes conversion of latitude and longitude to an addressing scheme that supports current TCP/IP (Ipv4) and future addressing (Ipv6/Ipng) requirements. More specifically, it allows a decentralization of the unicast point to a device on the hosted network. Geographical Internet Protocol (geoIP) addressing will facilitate anycast routing schemes in which the nearest node has a statically assigned geoIP. Geo-routing and network management become a function of the geoIP address.

U.S. Pat. No. 8,812,027 for "Geo-fence entry and exit notification system" by Obermeyer, filed Aug. 15, 2012 and issued Aug. 19, 2014, describes a method for determining when a mobile communications device has crossed a geo-fence. The method comprises (a) providing a mobile communications device (209) equipped with an operating system and having a location detection application resident thereon, wherein the mobile communications device is in communication with a server (211) over a network (203), and wherein the server maintains a geo-fence database (213); (b) receiving, from the operating system, a notification that (i) the location of the mobile communications device has changed by an amount that exceeds a predetermined threshold, or (ii) that a period of time has passed; (c) querying the operating system for a data set comprising the general location of the mobile communications device and the corresponding location accuracy; (d) transmitting the data set to the server; and (e) receiving from the server, in response, a set of geo-fences (205) proximal to the general location.

U.S. Pat. No. 8,837,363 for "Server for updating location beacon database" by Jones, filed Sep. 6, 2011 and issued Sep. 16, 2014, describes a location beacon database and server, method of building location beacon database, and location based service using same. Wi-Fi access points are located in a target geographical area to build a reference database of locations of Wi-Fi access points. At least one vehicle is deployed including at least one scanning device having a GPS device and a Wi-Fi radio device and including a Wi-Fi antenna system. The target area is traversed in a programmatic route to reduce arterial bias. The programmatic route includes substantially all drivable streets in the target geographical area and solves an Eulerian cycle problem of a graph represented by said drivable streets. While traversing the target area, Wi-Fi identity information and GPS location information is detected. The location information is used to reverse triangulate the position of the detected Wi-Fi access point; and the position of the detected access point is recorded in a reference database.

U.S. Pat. No. 8,892,460 for "Cell-allocation in location-selective information provision systems" by Golden, et al., filed Aug. 29, 2014 and issued Nov. 18, 2014, describes system and methods for allocating cells within a virtual grid to content providers according to various priority and selection schemes are used to target content delivery to information playback devices in a geographically and/or application selective manner. The priority schemes, geographical selectivity, and application selectivity of the system and methods of the invention allow a content provider to specifically target a desired demographic with high cost efficiency and flexibility.

U.S. Pub. No. 2014/0171013 for "Monitoring a mobile device en route to destination" by Varoglu, filed Dec. 17, 2012 and published Jun. 19, 2014, describes a system, method and apparatus are disclosed for monitoring a mobile device en route to a destination. A user of a monitored device specifies geo-fence regions along a route to the destination. Entry and exit of regions triggers the sending of event notifications to a monitoring device. Event notifications may be sent if an estimated time of arrival changes due to delay. Event notifications may be sent if the monitored device deviates from a planned route by a threshold distance. Event notifications may be sent through a direct communication link between the monitored device and monitoring device or through a location-based service.

U.S. Pat. No. 8,634,804 for "Devices, systems, and methods for location based billing" by McNamara, filed Dec. 7, 2009, and issued Jan. 21, 2014, describes devices, systems and methods are disclosed which relate to billing users of a telecommunication network. A billing server is in communication with a geo-fence database. The geo-fence database contains a plurality of geo-fences. Some geo-fences are associated with a single mobile communication device, such as a home geo-fence, work geo-fence, etc., while other geo-fences are global, such as a stadium geo-fence, toll geo-fence, etc. When a mobile communication device enters the perimeter of a geo-fence, a billing server changes the billing rate at which connections are billed to the user account or bills another user account. The mobile communication device may send a ticket code to the billing server for a reduced billing rate while within a geo-fence. If a mobile communication device enters a toll geo-fence, then the billing server charges the user account for the toll.

SUMMARY OF THE INVENTION

The present invention is directed to systems and methods for aerial vehicle registration. Aerial vehicles can be manned or unmanned. A global aerial vehicle registry leverages the existing global internet infrastructure to meet goals of scalability, reliability, a neutral global management structure while maintaining sovereignty over national airspace management and private information.

In one embodiment, a server computer and at least one database are constructed and configured for network communication with at least one aerial vehicle. The at least one aerial vehicle transmits a registration request to the server computer. The server computer assigns a unique registration identification (ID) for the at least one aerial vehicle. The at least one database comprises a geofence database storing information of a multiplicity of registered geofences. Each of the multiplicity of registered geofences comprises a plurality of geographic designators defined by a plurality of unique Internet Protocol version 6 (IPv6) addresses. One of the plurality of unique IPv6 addresses is encoded as a unique identifier for each of the multiplicity of registered geofences. The server computer caches the information of the multiplicity of registered geofences on the at least one aerial vehicle.

These and other aspects of the present invention will become apparent to those skilled in the art after a reading of the following description when considered with the drawings, as they support the claimed invention.

DETAILED DESCRIPTION

Figure 1:
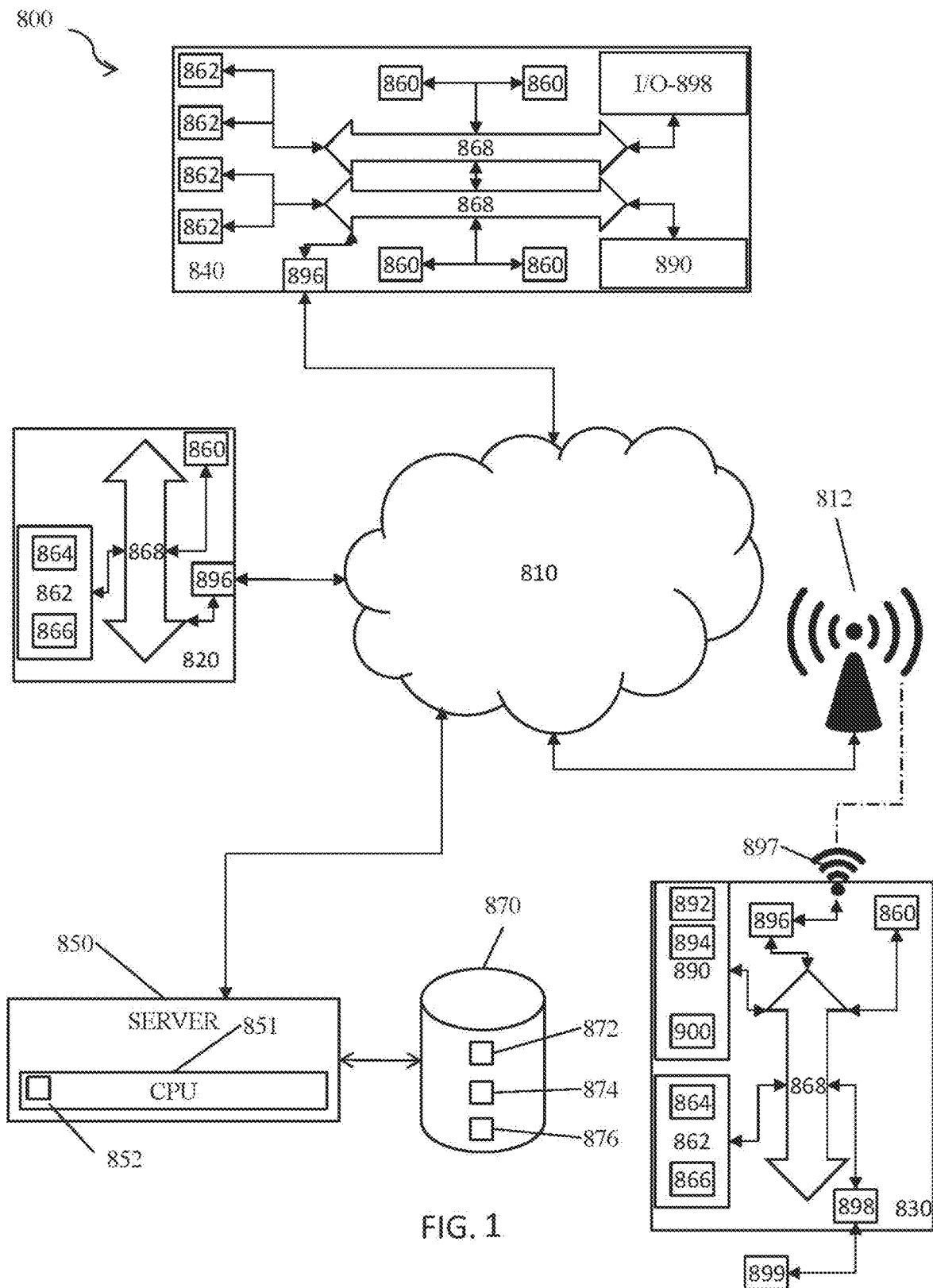
FIG. 1 is a schematic diagram illustrating a virtualized computing network used in one embodiment of the present invention.

Advantageously, geofences associated with a plurality of geographic designators, wherein each of the plurality of geographic designators is associated with an IP address provide for improved functionality, characteristics, and qualities of the geofence. Particularly, associating geofences with IPv6 addresses provides for at least improved safety, security, privacy, fair competition, competition management, resolution, definition, lookup, and control.

Hereafter, the terms drone, UAS, UAV, UAD, and UVS are used interchangeably. UASs, UAVs, UADs, UVSs, or drones include devices which are controlled remotely, operate fully autonomously, operate semi-autonomously, operate intermittently autonomously, operate via external sensors, and combinations thereof.

By contrast to the present invention, none of the prior art addresses the longstanding need for querying a database of geofences, with the geofences being associated with a plurality of geographic designators, wherein each of the plurality of geographic designators is associated with an IP address. The prior art geofences are almost all directed to centric or centroid technology, such as beacons. In the prior art, the functions within the geofence are typically limited to one function, such as advertising. Also, the intent around defining geofences is not as defined as in the present invention. In other words, the intent of an owner of a geofence does not correlate to the actual definition of the geofence in the prior art. A centroid geofence does not necessarily cover the entire intended area, nor does the centroid geofence only cover areas that are meant to be covered in the prior art. Instead, devices that the owner of the geofence wishes to receive content might not receive content due to the definition of the geofence surrounding the beacon. Similarly, devices that the owner of the geofence does not wish to receive content might receive content due to the definition of the geofence surrounding the beacon. Thus, there remains a need for methods and systems which provide for creating a database of geofences, wherein the geofences are defined by the intent and context of the content to be made accessible, inaccessible, or required for devices located within the geofence.

In particular, the geofences of the present invention delineate borders and property boundaries, ensure privacy, and protect the occupants inside the fence from unwanted intrusion as well as unwanted activities inside the fence. The geofences also indicate boundaries of authority. The rules on one side of a fence may differ from the rules on a different side of the fence. A geofence in the present invention is a virtual perimeter around a physical space. The physical space is the surface of the earth, the airspace above the surface of the earth, the ocean floor, and/or the space below the earth's surface. The present invention provides a global registry for rights of owners of geofences and others for the virtual property within the virtual perimeter. The rights of owners of geofences are analogous to physical signs which are placed on physical fences. Approval is required for owners to have rights with respect to the geofence, as well as for the owners to be listed in the registry. Preferably, the registry is globally published. Geofences are useful in combination with smart devices, which are able to sense geofences. Drones, smartphones/apps, and the internet of things all sense and react to geofences and comply with rules posted by geofence owners. As these devices become more autonomous, rules and associated boundaries are needed for these devices. This ensures proper operation of these devices, the safety of the public, and the rights of property owners. Smart devices may react in an obvious manner (ex: notification on a smart phone) or more subtle manner. Rules may relate to oppressing distracting features of a smart device within a geofence, such as automatically silencing the smart device within the geofence.

Virtual signs indicate rules that govern activity and presence within geofences. Certain features of apps may be switched on or off as instructed by a geofence. In a movie theater example, mobile phones should be silenced and cameras should not be used. Geofences provide for automatically disabling the camera and silencing the phone automatically upon the phone entering the geofence. The geofence may also include a rule which automatically silences the phone and disables the camera near or at the start time of a movie. Notably, each separate theater in a movie theater could have its own geofence.

Another case for geofence rules include disabling functionality of phones (ex: texting) while driving and disabling phone use while at school. Geofences can also be used for document encryption that requires a device to be inside a geofence for a document to open. Geofences can also be used in banking/ATM security and/or helping drones avoid the national airspace system, schools, prisons, and other high-risk areas.

Mobile device management systems can have their capabilities expanded through geofences. Geofence rules can instruct devices to install or uninstall apps automatically. Access to sensitive resources are disabled or enabled based on physical relation to geofences. Enhancing logistics systems, network services for convention centers and arenas, and services for presenters and performers can also be accomplished through geofences.

The geometry of a geofence can enter the database through data feeds of public records, official government sources, and mined and enriched data. A manual geofence editor may also be used. By way of example, a geofence may be drawn around the Louvre museum in Paris. The account user of the geofence editor should verify that they are directly responsible to enter and enforce rules of that geofence. Once geofences are published via the fence delivery network, they are stored in millions of cellular towers and Wi-Fi access points worldwide. This ensures that requests for cached fences are served with a speed increase of 30× over the prior art. This saves mobile device battery usage and usage of data on mobile devices. Several advanced peer to peer/mesh network protocol are also used to deliver requests for cached fences. Within a few seconds of being published via the fence delivery network, the fence data is available in cellular towers and Wi-Fi access points.

Another use case for geofences is in combination with portable security systems based on computer vision and artificial intelligence. Humans, vehicles, birds, and drones can be tracked with these systems. Targets can be verified that they are allowed to occupy a particular space within a geofence. Configuration zones can also be provided. These configuration zones describe the mission of portable security systems in a given area. By way of example, a mission designed to use radar and IR to detect drug smugglers and illegal immigrants on small boats at night can be attached to a geofence along a coastline. A second mission could be applied to a prison area to monitor and prevent delivery of drugs and weapons to prisoners. One of the mobile towers can be moved to another location. Upon redeployment, the mobile tower will automatically reconfigure itself. The details of the mission are expressed to the mobile tower through the geofence.

App developers and device manufacturers can enable their products with the platform of the present invention by embedding the fencing agent of the present invention into their code. The fencing agent preferably includes a small library and a certificate. The certificate is used to enroll the product into the platform. Once enrolled, the app developer or device manufacturer can grant owners of geofences the ability to deliver entitlements directly to the product.

In another embodiment, the fencing agent is included in a target chip which is added to a device. In yet another embodiment, the fencing agent is included on a chip already existing in the device, with the chip performing another function on the device or being necessary or supplemental to the operation of the device, such as a chip in the operating system of the device.

Prior art provides for positioning with mobile communication devices via operating systems (such as Google Android and Apple iOS) using latitude and longitude (Lat/Long) single points, which are always wrong or inaccurate, having both accuracy and range at the level of meters. Mobile operating system vendors use wi-fi, iBeacon, global positioning system (GPS), magnetometer, and inertial navigation to determine location for mobile communication devices. Note that the present invention systems and methods are not used to provide for determining position or improve accuracy of the prior art. However, the present invention systems and methods advantageously provide for fast and accurate geofence identification, registration, and lookup via mobile devices.

One embodiment of the present invention includes a method for enforcing at least one rule within a geofence, including a fencing agent of an unmanned aerial vehicle (UAV) identifying that the UAV is physically located within at least one zone of a geofence, the fencing agent of the UAV identifying at least one rule associated with the at least one zone of the geofence in a geofence database, wherein the at least one zone of the geofence is at least one of a plurality of zones in the geofence, wherein the plurality of zones includes a hierarchy, the fencing agent implementing the at least one rule associated with the at least one zone of the geofence while the UAV is physically located within the at least one zone of the geofence, and if a conflict is detected between rules for a higher ranked zone in the hierarchy and rules for a lower ranked zone in the hierarchy, the fencing agent implementing the rules for the higher ranked zone while the UAV is physically located within the higher ranked zone and the lower ranked zone, wherein each of the plurality of zones is defined relative to a central point, wherein the central point is defined by a unique Internet Protocol (IP) address in the geofence database, and wherein the unique IP address is a unique identifier of the geofence.

Another embodiment of the present invention includes a system for enforcing at least one rule within a geofence, including a fencing agent for an unmanned aerial vehicle (UAV), wherein the fencing agent is operable to identify when the UAV is physically located within at least one zone of a geofence, wherein the fencing agent is further operable to identify at least one rule associated with the at least one zone of the geofence, and wherein the fencing agent is operable to implement the at least one rule associated with the at least one zone of the geofence, wherein the at least one zone of the geofence is at least one of a plurality of zones in the geofence, wherein the plurality of zones includes a hierarchy, wherein, if a conflict is detected between rules for a higher ranked zone in the hierarchy and rules for a lower ranked zone in the hierarchy, the fencing agent is operable to implement the rules for the higher ranked zone while the UAV is physically located within the higher ranked zone and the lower ranked zone, and wherein each of the plurality of zones is defined relative to a central point, wherein the central point is defined by a unique Internet Protocol (IP) address in the geofence database, wherein the unique IP address is a unique identifier of the geofence.

Yet another embodiment of the present invention includes a method for enforcing at least one rule within a geofence, including a fencing agent of an unmanned aerial vehicle (UAV) identifying that the UAV is physically located within a geofence, the fencing agent of the UAV identifying at least one rule associated with the geofence in a geofence database, and the fencing agent implementing the at least one rule associated with the geofence while the UAV is physically located within the geofence, wherein the geofence is defined relative to a central point, wherein the central point is defined by a unique Internet Protocol (IP) address in the geofence database, wherein the unique IP address in the geofence database is a unique identifier of the geofence, and wherein the unique IP address includes metadata associated with the geofence.

In one embodiment, Federal Aviation Administration (FAA) rules are enforced with geofences in the context of airspace management of Unmanned Aircraft Systems (UAS) or drones. In another embodiment, the geofence participates with the drone in an advisory system for aviation safety and national security for airports, restricted airspace, national security sites. In the advisory system, the operators must interpret regulations, seek guidance from regulators or an attorney, and make judgements regarding the operation of the UAS. The UAS can be for commercial, governmental, educational, or recreational use. In the rule enforcement and advisory system embodiments, airspaces change over time and there is a two-way exchange of information between UAVs and/or UAV operators and airports. Preferably, the two-way exchange of information is over a network between a server computer including a processor and a memory and a UAV, or between the server computer and a device including a processor and a memory associated with the UAV and operated by the operator of the UAV.

In one embodiment, redefining a zone or the geofence in the geofence database is performed by redefining the plurality of zone/geofence IP addresses, wherein redefining the plurality of zone/geofence IP addresses includes adding additional zone/geofence IP addresses, deleting one or more of the plurality of zone/geofence IP addresses, and/or changing one or more of the plurality of zone/geofence IP addresses. In another embodiment, redefining a zone or the geofence in the geofence database is performed by redefining the longitude, latitude, and/or altitude associated with the points defining the zone and/or geofence. Redefining the geofence and/or the zone of the geofence is preferably performed in real-time by updating the geofence database.

In one embodiment the source of air space information is obtained through partnerships with air space mapping companies, aviation authorities, and government agencies. In another embodiment the air space information is gathered through a GUI for airports and operators to create airspaces using shapes such as cones, circles, ellipses, or polygons overlaid on a map. In such an embodiment the shapes on the map are geofence geometries and the center point of a circle shape is a geographic designator, geocode, or lat/long location from which a radius is drawn for an airspace shape. In another embodiment where the shapes are not circular, the points required to define fence geometries of corresponding shapes are defined using geographic designators, geocodes, or lat/long locations. In an embodiment for determining which rules should be applied to a UAS, the points creating geometries of fences and the shapes are used to create three-dimensional (3D) projection in space that is resolved by the UAS using information provided by the geofence system.

In embodiments with geometries using points where the points are geographic designators, geocodes, or lat/long locations, there is at least one anchor for the geofence and the anchor is assigned an IPvX address where X is any version of the IP protocol. In a preferred embodiment, the IP address is an IPv6 address.

In one embodiment, the registration of geofences for airspace management is required for restrictions around predetermined locations by way of example and not limitation infrastructure and components thereof, power plants, electric power grid components, communication network components, data centers, water treatment facilities, oil and gas treatment plants, government and or military facilities, prisons, and other sensitive areas where concerns raised by UAS operators is non-aviation related. Information exchange requirements between operators and interested parties require an advisory or rule implementing system and exchange of real-time, near real-time information, or pre-flight information between the UAS operator and the interested party or governing agency. Sensitive events requiring implementation of rules or exchange of information include VIP travel, stadium events, forest fires, and events requiring permits in public space or events triggered by changing circumstances. Since airspace management is driven by events, events include temporary flight restriction. Events are managed through digital notice and awareness systems (D-NAS) implemented by UAS airspace management companies such as Airmap. In one embodiment, systems manage exchange of information in real-time, near real-time, or prior to flight between UAS operators and third parties such as airports or government agencies. In this embodiment, the configuration of rules based on regulations or interests governing the third party such as adhering to FAA regulations for airports or in the case of forest fires, exchanging information with the National Interagency Fire Center are applications built with geofencing information. It is an object of this invention register geofences for airspaces and to include as metadata the required information for implementation of rules for systems that exchange information between UAS operators and third parties.

In one embodiment for implementing airspace rules includes maps and information including, but not limited to: a map with restricted airspace, temporary flight restrictions, areas mapped for recreational flights, maps for airspace below 500 feet, upper level airspace, classes of airspace (such as B, C, D, and E), and information for commercial operations requiring notice or authorization depending on jurisdiction, Section 333 exemptions from the FAA, certificate or waiver authorizations, or blanket Certificate of Waiver or Authorization (COA). In one embodiment, the classes of airspace are defined as concentric shapes, such as concentric circles, concentric squares, concentric spheres, concentric cubes, concentric half-circles, concentric hemispheres, concentric ellipses, concentric spheroids, concentric triangles, concentric cones, concentric cylinders, concentric pentagons, concentric pentagonal prisms, concentric hexagons, concentric hexagonal prisms, etc. In this context, concentric means shapes which share the same center, with the larger shapes surrounding the smaller shapes. Heights of three dimensional (3D) geofences, including concentric and non-concentric spheres, hemispheres, spheroids, cones, cubes, pentagonal prisms, hexagonal prisms, etc. are operable to be defined by a radius from the center or by an altitude. In another embodiment, the height of a 3D geofence extends to the troposphere, stratosphere, mesosphere, thermosphere, and/or exosphere. In yet another embodiment, the height of a 3D geofence extends upwards infinitely from a defined perimeter on the ground. The information from maps and metadata needed to comply with rules are part of the system stored in geofences as metadata, stored in software operating within or around the geofence or stored in the cloud and used by the geofence and system applications.

In one embodiment, the implementing rules for Unmanned Aircraft Systems (UAS) operators include digital notification from the UAS operators to airports or third parties. In one implementation by Airmap, D-NAS has features including a cloud-based solution with profile configuration, text-based notification, phone number registration, a GUI for configuration by airport, configuration settings for receiving notification, parameters for setting floor and ceiling and accepting notifications, creation of airport defined zones (ADZs), settings for enabling and disabling spaces, prioritization of notifications using risk levels, etc. Notifications are operable to be sent by a server computer over a network to the UAV or to a device in network communication with the UAV. In one embodiment, the notifications include instructions to override a rule associated with a geofence or a zone of the geofence temporarily or permanently for the UAV.

An object of this invention is to provide caching of geofence rules used to implement notification or advisory systems for UAS operators and third parties, advantages using IP encoding of geofence points and geometry, geo-caching of metadata in the geofence databases, and prioritization of notifications using classes, entitlements, metadata, and zones.

In embodiments where the geofence is defined using a central point, the central point is preferably associated with a longitude, a latitude, and/or an altitude in the geofence database. Other points defining the geofence or zones of the geofence include a longitude, a latitude, and/or an altitude in one embodiment. Preferably, the IP addresses associated with the central point and/or the other points defining the geofence are IPv6 addresses.

In one embodiment, the plurality of zones are concentric shapes around the central point.

Concentric Shapes

In another embodiment, at least one rule within a geofence, a fencing agent of a device identifying the device is physically located within a geofence, the fencing agent of the device identifying at least one rule associated with the geofence; and the device implementing the at least one rule associated with the geofence, wherein the fencing agent is embedded in a code of an application on the device, the fencing agent is included in a chip added to the device, or the fencing agent is included in a chip in an operating system of the device.

In one embodiment of the present invention, a method is provided for finding a geofence in a geofence database, including determining a geographic location, searching for the geographic location in the geofence database, and identifying at least one geofence associated with the geographic location, wherein the at least one geofence is defined by a plurality of geographic designators, wherein each geographic designator is associated with an IP address.

In methods and systems for delivering geofence information by one or more processors according to the present invention, the following steps are included: generating at the device a first request comprising a coordinate point of a geographic location associated with the device; converting the coordinate point (dB key for a region) to an Internet Protocol (IP) address and generating an anchor point corresponding to the IP address; identifying one or more geofences that are associated with the coordinate point; and creating a response to the request wherein the response comprises information describing the one or more identified geofences.

In one embodiment, the request includes at least one geographic designator. Preferably, the at least one geographic designator is associated with an Internet Protocol (IP) address that is converted to an anchor point for each geofence.

In yet another embodiment, the geofence information further includes at least one class and at least one entitlement.

Another embodiment of the present invention further includes the step of, if at least one entitlement exists for any geofence returned, a reason code or a violation code is automatically provided with the response. Alternatively, if at least one entitlement exists for any geofence returned, a reason code or a violation code is automatically provided to the at least one device, and the at least one device responds accordingly, based upon how it has been programmed to respond. In one embodiment, the response includes compliance with at least one rule associated with the at least one entitlement. Another embodiment includes the step of automatically blocking an attempt by the at least one device to access a website based on the at least one rule.

Yet another embodiment of the present invention includes the step of receiving a request from the at least one device for activating at least one rule associated with a license for predetermined geofence(s) and corresponding class(es) and entitlement(s) for the at least one device.

In yet another embodiment, the present invention includes the step of receiving an activation message. Preferably, the activation message includes terms of payment, terms of time, terms of use, terms of termination, terms of assignability, terms of content, terms of confidentiality, a warranty, post-termination rights, and/or a notice. Another embodiment provides for the step of activating the at least one rule associated with the license on the at least one device including transmitting an activation packet to the at least one device, wherein transmitting the activation packet to the at least one device transforms the at least one device from a first state to a second state.

The present invention provides for the additional step of receiving an acceptance of a license agreement from the at least one device before activating at least one rule associated with a license for the at least one device for each geofence and corresponding at least one entitlement in another embodiment.

In yet another embodiment, the present invention further includes the step of storing information relating to at least one rule associated with at least one geofence in a geofence database.

Another embodiment provides for determining a license associated with the geofence and activating at least one rule associated with the license on at least one device, wherein the geofence is defined by at least one geographic designator; and wherein the at least one rule includes a rule directed to a content stored on the at least one device or accessible from the at least one device within the geofence. Preferably, the at least one rule includes a rule restricting or enabling access to the content stored on the at least one device or accessible from the at least one device within the geofence.

In one embodiment of the system of the present invention, the at least one geofence is determined by at least one geographic designator that is automatically associated with a corresponding Internet Protocol (IP) address. Preferably, the IP address is automatically converted to an anchor point for each geofence.

Another embodiment of the present invention provides for populating a cache with geofence information. In one embodiment, the cache is a local cache. Preferably, the local cache is within a geofence, a room, a building, or any other defined perimeter. Preferably, the cache is stored on a router, modem, or any other Internet related hardware. Advantageously, the cache provides for faster lookup of geofence information for a geofence or a plurality of geofences for other devices once a first device has accessed the geofence information for the geofence or the plurality of geofences. Alternatively, the router includes geofence information in a cache without a first device accessing the geofence information.

In a deployment diagram, the first step does not require being performed over the network, because it is provided for determining a position using the DNS resolver; then querying with a single IP address; receiving an anchor point with IP address within the DNS resolver block functions; noting that multiple anchor points exist for the multiple geofences within the ROI; all requesting steps from the fencing agent are made between the DNS revolver and the public infrastructure; within the portal and in continuous production of geometry where the system and methods of the present invention automatically generate the anchor points, and then automatically identify or locate them within the public infrastructure, then left of red in the figure, the fencing agent reasons about relation of fence geometry from correct position (to right).

In another embodiment, the ROI is determined based upon location services operating on the at least one device.

Another embodiment of the present invention provides for a querying a geofence database system including a geofence database including at least one geofence defined by a plurality of geographic designators, wherein each geographic designator is associated with an Internet Protocol (IP) address and a server including a processor, wherein the server is operable to register the at least one geofence and the associated IP address in the geofence database and wherein the associated IP address is a unique identifier of the at least one geofence.

Preferably, the first request is a Domain Name System (DNS) query and the response is a DNS response. In one embodiment, the step of converting the coordinate point to the IP address comprises querying a geofence database with data stored thereon for IP addresses, anchor points for geofences, and coordinate points for geographic locations. In another embodiment, the step of identifying one or more geofences comprises querying a geofence database, wherein the geofence database stores information describing each geofence.

Preferably, the information describing each geofence includes at least one of an indication whether the geofence is verified or unverified, a class of the geofence, an entitlement of the geofence, a time-to-live value, and a context summary of the geofence.

The present invention also provides for a method for querying for a geofence registered in a database of geofences, the method including defining a geofence using at least one geographic designator, assigning an interne protocol (IP) address to each of the at least one geographic designators defining the geofence, and storing the at least one geographic designator and the assigned IP address of the at least one geographic designator in the database of geofence, wherein the IP address assigned to each of the at least one geographic designators is a unique identifier of the geofence.

In preferred embodiments, the IP address is an IPv6 address, which has enhanced functionality that is associated with IPv6, including providing for improved geofence registration, faster geofence identification/lookup, and the ability to more accurately define the geofences, including the intent of the geofence owner for classes and/or entitlements that provide for permissions for activities, access, and/or messages within the associated geofence. In preferred embodiments of the present invention, the geofence is a non-centroid or non-centric geofence.

Figure 11:
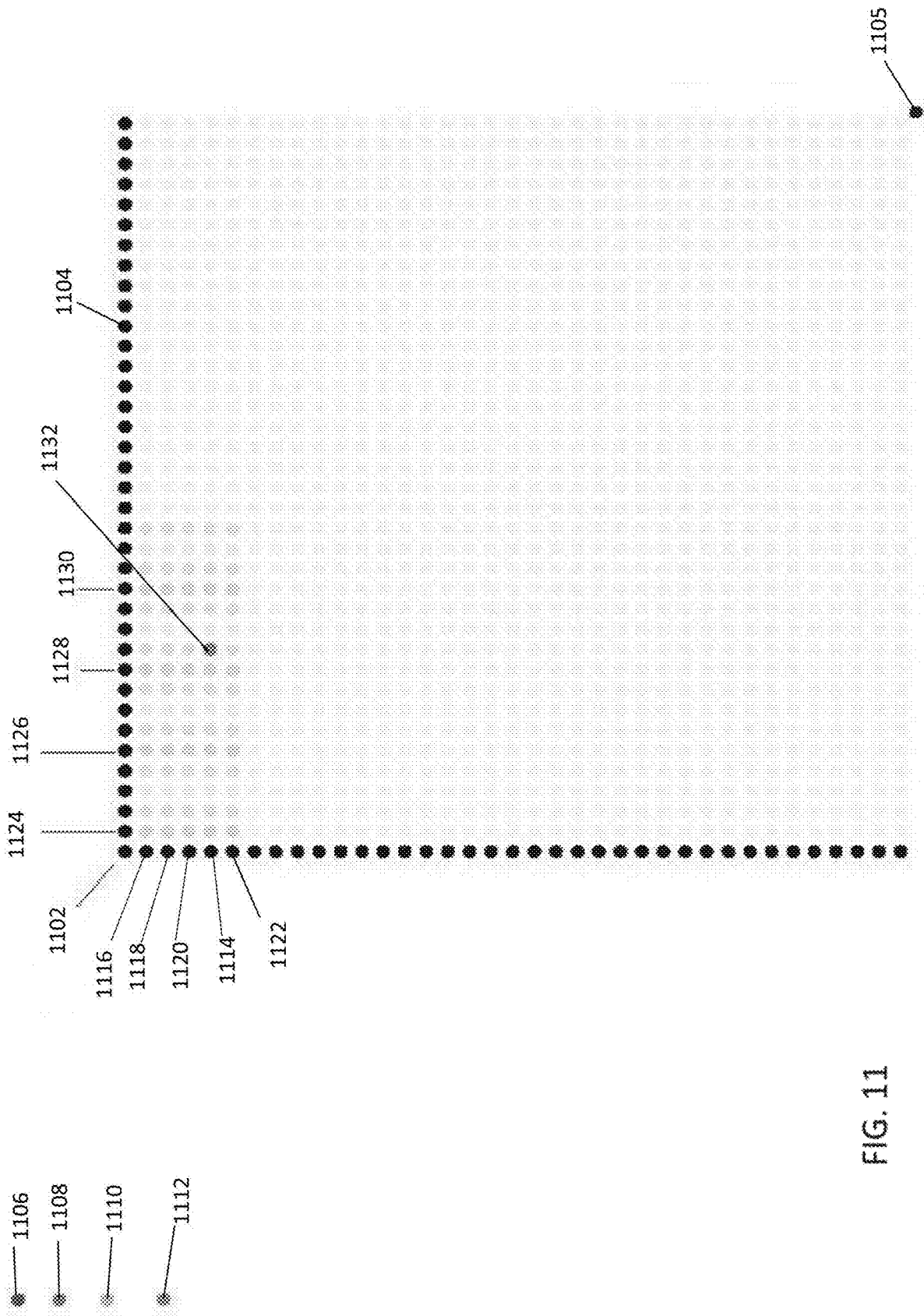
FIG. 11 is a schematic diagram illustrating the encoding of a class and entitlement on an IPv6 address according to one embodiment of the present invention.

Encoding anchor point(s) with IPv6 addresses may be illustrated by FIG. 11 showing pyramid projections having multiple levels. In a flat projection, zoom level 1 provides for coverage of the entire planet; these expand to zoom level 32 at 64-bit density, which provide for class and/or use or entitlement identification within the metadata for lookup. By way of example and not limitation, a tile mapping system may be used; tile naming provides for a directory structure that indexes for search and lookup within the systems and methods of the present invention.

In systems and methods of the present invention, geofence anchor points are provided and defined as a member point on a boundary of a geofence or within a geofence boundary and are used as the geofence address, i.e., the geofence address that is registered with the geofence registry. Notably, multiple overlapping geofences can occupy the same physical space or geographic space. Significantly, in the present invention, the geofences are defined not by lat/long but by a member point or anchor point, which can be on the boundary of a geofence or within the boundary of that geofence. The intent or purpose of the geofence, which is defined by the entitlements and/or classes established by the geofence owner, is established with the anchor point used as the geofence address (IPv6 preferably).

By way of example for illustration purposes, in software or mobile applications (Apps) that monitor specific types of geofences (or fences) then a region of interest (ROI) is provided for the geofence covered within the App, for each geofence of interest; a query is sent for the geofence(s), not for the region of interest. The geofences are registered with categories or classes, by way of example and not limitation, for a city, school, park, etc. (see also case study illustrated by GUI shown in FIG. 4). A multiplicity of Apps accesses the geofences registration information based upon the ROI determined by the location services of the mobile device and the query for geofence(s) within the App. For another example, consider an App that only works for a school geofence class; based upon the mobile device running the App within the ROI encompassing the school, the App will actively block rumor sites or social media sites while the mobile device location (based upon the operating system location services for that device) is within the school geofence physical area. For yet another example, a non-regulated car service such as Uber, having an App operable on a mobile device ("Uber App") if the App developer has agreed with this geofence policy and developed the App accordingly, then when the mobile device is physically or proximally in predetermined location within a geofence, such as an airport, the airport geofence may have restrictions that disable or block the Uber App from functioning when the mobile device location services indicate that it is within the airport geofence.

The systems and methods of the present invention further provide for automatic notification of geofence identification via Apps operating on mobile communication devices including the standard notification of approach, enter, exit, and dwell, and augmenting or supplementing them with important information provided only with the present invention, including geofence ownership, geofence entitlements, geofence use date, and/or messaging with at least one reason code and/or at least one violation code. The App functionality may further enable or disable functionality of the mobile device based upon the entitlements and/or other supplemental information. By way of example, consider another use case for a mobile payment App, such as Square App. Food trucks may only operate within a licensed district. A signed certificate or official permit or license evidences and represents that the food truck has been granted a legal permission that is a basis for an entitlement to operate the food truck within a predetermined or specified time period (duration), geography, and operational hours during days within the predetermined time or specified time period of the license, permit, or certificate. A mobile payment App (Square App) or other mobile commerce App developed to comply with the rule, law, certification, permit, or license, will lock or unlock the payment or commerce function of the point of sale (POS) App, based upon the geofence and corresponding entitlements detected automatically by the App considered with the location services of the mobile device and/or the POS App used by the Food Truck and its location services detected thereby. A notification message is provided on the device hosting the App (POS device and/or mobile device) indicating payment inactivation or other notice to indicate that that payment function is not authorized and/or provide a reason code or violation code.

According to the present invention systems and methods, upon receiving an initial query about a region of interest (ROI) from an App operable on a mobile communication device via a network, at least one anchor point within the ROI with corresponding classes of geofences is identified by the at least one server. Upon receiving a second query (or second part of information requested in the initial query) to a specific class if any interest to downselect from the ROI geofences is provided; the specific class is selected from at least a type of class and a class hierarchy that include groups of types of geofence owners and/or groups of types of use cases. By way of example and not limitation, groups are selected from federal government, state government, city or local government, education or schools, community, residential, fire district, home owner associations, parks, commercial, private, and combinations thereof. Also, types of commercial groups may be further defined or detailed.

Significantly, the systems and methods of the present invention provide for high efficiency for delivering query responses using caching of geofence information within the ROI from prior queries on unrelated mobile devices. By managing the balance of zoom level detail with metadata included with each geofence, the geofence information delivery efficiency is optimized. More detailed or deeper hierarchy structure for geofence classes (or zoom level) requires more metadata, by way of example and not limitation, for use with Internet of Things (IoT) applications of the present invention.

Also, examples of geofence classes include official signed or certified classes, verified, etc. The classes provide an organized framework for geofence owners and operators or managers of geofences and entitlements to communicate with third parties about the existence and intent or conditions of the geofence through the automated systems and methods of the present invention for registering and providing for mobile device lookup or querying to identify the geofences within the ROI based upon the mobile device location service position. Notification output in real time or near real time to Apps (or to developers of Apps who determine how to manage and respond to the geofence information that is registered).

Prior art provides for proximity-based detection of geofences and notices for a mobile device that provides for geofence identification and enter/exit/dwell status of device with respect to the proximity or position of the device to the geofence; notably, almost all are centroid-based geofences wherein a signal emitter device or beacon functions as a center point for the geofence. By contrast, the present invention systems and methods provide for non-centroid geofences that are more accurate with respect to the geofence boundary than with prior art (present invention is accurate for range to less than 1 cm, and even to less than one micron). The present invention also does not require the presence of a signal emitter device or beacon; the mobile device itself and at least one App operable thereon for querying for the existence of geofence(s) in the ROI proximate the mobile device provide for the identification using wireless communication with the geofence registration server(s). Also, advantageously, the present invention provides for automated notification messages or notices that provide for alert(s) to the mobile device user and/or changes in the graphic user interface (GUI) of the device for indication of device status with respect to the geofence (approach enter, exit, dwell) and geofence class and/or entitlements. Features and/or functions of the device may appear or active and disappear or deactivate, provided that controls or settings on the device are enabled.

By way of example for a residential case or use of the present invention systems and methods, a pet tracker App is provided on a mobile communication device or smartphone. Location services are activated on the device and/or in the App. With respect to the residential property, a geofence may be registered for the physical property boundary that is certified or verified by public records, including location of a house structure positioned on the property and the real property surrounding it. A backyard only area may be registered as a non-verified geofence that is acknowledged or identified by the App for use with the pet tracker. The App provides for programming of automated triggers that may indicate messaging or notification that the pet having a geolocation device associated with it has changed status with respect to the geofence(s) (approach, enter, exit, dwell) and the class of each of the geofences (verified and non-verified).

So in each case the mobile device must identify where the device is within the geofence or proximal to it.

Pairing for 2D and 3D geofences is also provided with improved accuracy by the present invention. By way of example, consider the use case where a mobile device such as a smartphone having an App operable thereon can pair or coordinate with other activated devices within a geofence, such as a remote controller App for use in activating lights, HVAC, and/or audio/video devices within a hotel room after the user has checked into the hotel. The smartphone position with respect to the geofence(s) of the hotel overall, but more specifically to only one room within the hotel, requires more accurate positioning with respect to the geofence and for pairing with devices located within that geofence of the hotel room only, so that the remote controller App on one device does not affect controls or settings outside the hotel room geofence (i.e., in another room where the user is not a registered guest). Entitlements are also provided in this use case, for example by the HVAC device manufacturer, who provides a certificate of entitlement for remote control of the device wirelessly to the hotel; the hotel then has verified authority to extend the ongoing entitlement (duration of years) to the user who has checked into the hotel (duration of days) during their registered stay only. This illustrates how balancing for optimization of zoom level or class detail and class pairing is provided to provide for higher zoom level (Internet of Things (HVAC controls, TV controls, lighting controls, etc.)) compared with a lower zoom level or detail in the metadata for real estate more generally.

In yet another example of the systems and methods of the present invention, a first step provides that any device that has an App or is programmed to request geofence information for a ROI. The device is not limited to smartphones or mobile phones, but includes any mobile device having a processor coupled with memory that is programmed to query for geofences and respond according to class and entitlements that it will receive notices and/or respond to. Where a ROI is provided at 1 km (e.g., at zoom level 15) all classes above that ROI proximity are filtered out. If any entitlement exists for any geofences returned, a reason code or violation code is provided by the fencing agent, which responds accordingly, based upon how it has been programmed to respond. Compliance with entitlements is computed locally by the fencing agent based on factors such as time of day and proximity to a fence. In one example use case, a drone flying mobile device having programming or a "drone App" operable thereon automatically queries based upon its proximity to geofence(s) for its class and zoom range pairing.

Geofence Efficient Lookup or Query by a Fencing Agent

As referenced in FIGS. 5A and 5B hereinbelow, stakeholders in the geofence registry systems and methods of the present invention use a web-based portal to configure their account's geofence, including identification of classes and/or entitlements; this configuration is stored on the at least one server or account server(s). On start-up, the fencing agent (FA) operable within the App pulls the configuration and validates its own signature with its own developer certificate. When the FA is initiated by its containing App, the Fence Delivery Network (FDN) lifecycle returns a set of fence points that may be translated by the FA into standard fence geometry such as geoJSON (polygon or centroid); upon receipt of a set of geofences, the FA automatically begins monitoring the geofences. Indications of classes and/or entitlements are also received by the FA within the App. The entitlements may indicate that proximity to a particular corresponding geofence provide for the geofence owner, operator or manager to request particular GPS power levels, FDN caching preferences, resolution, time of day restrictions, or to be promoted to a system level fence on the device's motion co-processor, which offloads monitoring for sleep state awakening. Upon approaching, entering, exiting, dwelling, or ranging to a geofence edge, the FA wakes or notifies the containing App with metadata including information for the geofence owner, class, signature, certification, and/or verification indications, validity date range or duration, and entitlements.

In the FDN query lifecycle, the mobile device automatically determines its own geolocation or position by operating system and GPS (i.e., its own lat/long); the FA converts the lat/long to an IPv6 geofence coordinate point (or point that is not a lat/long point); the FA determines the nearest anchor point for the region of interest (ROI); the FA sends reverse DNS query for the anchor point to at least one remote server via a network; the FA receives a DNS record including the anchor points of geofence(s) within the ROI, wherein the anchor points include metadata indicating ownership and use or intended use for the geofence(s) associated with the anchor point(s); the FA filters anchor points based upon subsequent queries and/or based upon grants of use extended to the FA through its developer certificate; the FA sends reverse DNS query for each of the filtered sets of geofence anchor points; the FA receives the DNS record(s) corresponding to and containing the constituent points of each geofence (polygon or centroid); and the FA converts the points to lat/long or other coordinate system in a geometry format for use by the mobile device operating system and Apps such as geoJSON.

For encoding of anchor points as IPv6 addresses, the range of available bits for metadata (64+ bits) compared with location data (0-63 bits) depends upon the size of IPv6 allocation, and the optimization of the metadata for zoom, as described hereinabove, such that changing the 64-bit boundary for location affects the zoom level or amount of metadata used for class, entitlements, and other geofence owner and intent for use information. The utility of IPv6 addresses for routing and Internet access will be achieved through the alignment of this zoom level/metadata boundary with IPv6 CIDR (classless inter-domain routing) and nibble boundaries etc. For Internet of Things (IoT) applications, owners of geofences large enough to comprise enough IPv6 addresses to make an acceptable size router announcement, may announce and utilize their block of public address space, which assists IoT devices in discovery and self-provisioning, for example as described in use cases hereinabove.

Defining the Boundaries of the Geofences

There are many ways to define what constitutes a geofence under the present invention. Preferably, the geofence is defined using at least one geographic designator. Preferably, the geographic designator is a coordinate point or set of coordinate points. However, the geographic designator can be any identifying information for a geographic point, location, or area. In one embodiment, the geofence is defined by a series of coordinate points with lines connecting the series of points. The geofence is preferably a polygon in shape. In another embodiment, the geofence is an irregular shape. In a further embodiment, the geofence is a regular shape, such as a square, rectangle, triangle, circle, etc.

In one embodiment of the present invention, the geofences are defined by real property boundaries. Preferably, the real property boundaries are the boundaries defined by public records for the property. In another embodiment, the real property boundaries are user-defined. In one embodiment, the real property boundaries include public right of ways such as roads and sidewalks. In another embodiment, the real property boundaries do not include public right of ways. In one embodiment, the boundaries of the real property and/or the boundaries of the geofences are defined within between about 0.5 microns and about 3 meters. In another embodiment, the boundaries of the real property and/or the boundaries of the geofences are defined within between about 0.5 microns and 1 meter. In another embodiment, the boundaries of the real property and/or the boundaries of the geofences are defined within between about 0.5 microns and 30 centimeters. Preferably, the boundaries of the real property and/or the boundaries of the geofences are defined within between about 0.5 microns and 5 microns. Even more preferably, the boundaries of the real property and/or the boundaries of the geofences are defined within between about 0.5 microns and 1 micron. The precision, accuracy, and/or resolution of the boundaries is dependent upon the nature of the IP address used. Preferably, optimal precision, accuracy, and/or resolution is achieved using an IPv6 address.

Notably, in one embodiment, the geofence can be defined either by a perimeter of points or by an area of points. In one embodiment, the points of the coordinate system used to define the geofence are defined between about 0.5 microns and about 1 micron. In other embodiments, the points of the geofence are defined between about 0.5 microns and about 2 microns, between about 0.5 microns and about 5 microns, between about 0.5 microns and about 10 microns, between about 0.5 microns and about 15 microns, between about 1 micron and about 2 microns, between about 1 micron and about 5 microns, between about 1 micron and about 10 microns, between about 1 micron and about 15 microns, between about 5 microns and about 10 microns, between about 5 micron and about 15 microns, between about 0.5 millimeters and about 2 millimeters, between about 0.5 millimeters and about 5 millimeters, between about 0.5 millimeters and about 10 millimeters, between about 0.5 millimeters and about 15 millimeters, between about 1 millimeter and about 2 millimeters, between about 1 millimeter and about 5 millimeters, between about 1 millimeter and about 10 millimeters, between about 1 millimeter and about 15 millimeters, between about 5 millimeters and about 10 millimeters, between about 5 millimeter and about 15 millimeters, between about 0.5 centimeters and about 2 centimeters, between about 0.5 centimeters and about 5 centimeters, between about 0.5 centimeters and about 10 centimeters, between about 0.5 centimeters and about 15 centimeters, between about 1 centimeter and about 2 centimeters, between about 1 centimeter and about 5 centimeters, between about 1 centimeter and about 10 centimeters, between about 1 centimeter and about 15 centimeters, between about 5 centimeters and about 10 centimeters, between about 5 centimeters and about 15 centimeters, between about 0.5 decimeters and about 2 decimeters, between about 0.5 decimeters and about 5 decimeters, between about 0.5 decimeters and about 10 decimeters, between about 0.5 decimeters and about 15 decimeters, between about 1 decimeter and about 2 decimeters, between about 1 decimeter and about 5 decimeters, between about 1 decimeter and about 10 decimeters, between about 1 decimeter and about 15 decimeters, between about 5 decimeters and about 10 decimeters, between about 5 decimeters and about 15 decimeters, between about 0.5 meters and about 2 meters, between about 0.5 meters and about 5 meters, between about 0.5 meters and about 10 meters, between about 0.5 meters and about 15 meters, between about 1 meter and about 2 meters, between about 1 meter and about 5 meters, between about 1 meter and about 10 meters, between about 1 meter and about 15 meters, between about 5 meters and about 10 meters, between about 5 meter and about 15 meters, and any combination thereof (ex: between about 1 micron and about 5 decimeters, between about 5 centimeters and about 10 meters, etc.).

In another embodiment, the geofences are defined by the perimeter of a structure, such as a house, an office building, an apartment, an apartment complex, a duplex, half of a duplex, a business, a hotel room, a rented space, or a recreational facility.

In yet another embodiment, the geofences are defined by city or town limits.

While most preferred embodiments of the present invention are non-centric or non-centroid geofences, or polygon geofences, alternative embodiments include centric or centroid geofences. Centric geofences are defined as the area within a certain radius of a beacon or other central point of reference.

In one embodiment of the present invention, the boundaries of the geofences are permanently defined. In yet another embodiment of the present invention, the boundaries of the geofences are temporary. Whether the boundaries of the geofences are permanent or temporary depends upon the nature of the property being geofenced. For example, geofences surrounding booths at trade shows, are preferably temporary because the booths themselves are temporary. Other examples of exemplary temporary geofences include hotel rooms, groups of hotel rooms, camp sites, and construction sites.

Another embodiment of the present invention includes systems and methods for updating the boundaries of a geofence. Preferably, the boundaries of a geofence are updated in a geofence database when the boundaries of the geofence are modified. In one embodiment, the boundaries of the geofence are automatically updated. In another embodiment, the boundaries of the geofence are updated by the owner of the geofence. In yet another embodiment, the boundaries of the geofence are updated by a licensee of the geofence.

Registering and Verifying a Geofence

The present invention includes a method and system for identifying based upon a request by at least one device a geofence that is registered in the geofence database. In one embodiment, a method for registering the geofence includes inputting geographic designators defining a geofence, wherein each of the geographic designators are associated with an Internet Protocol (IP) address, inputting an owner name for the geofence, and submitting the geographic designators and owner name to a geofence database.

Another aspect of the present invention involves methods and systems for verifying the information in the database, including the boundaries of the geofences, the IP address associated with the geographic designators defining the geofences, contact information associated with the geofences, an owner associated with the geofences, licensees of the geofences, and combinations thereof. In one embodiment, an owner of the geofence verifies the information associated with that geofence. In another embodiment, a third party verifies the information associated with geofences.

Database of Geofences

In one embodiment of the present invention a method is provided with steps for creating a database of geofences, wherein the geofences in the database are associated with an IP address. Preferably, each geofence in the database is associated with at least one IP address. One embodiment involves defining the geofence by the boundaries of the geofence. In another embodiment, a set of individual coordinate points are listed along with a unique IP address associated with each set of individual coordinate points. Preferably, each set of coordinate points is associated with only one IP address. In one embodiment, the IP address is an IPv6 address. In another embodiment, the IP address is an IPv4 address. In yet another embodiment, the IP address is a future standard for determining IP addresses, such as IPv8 or IPvX.

The database of the present invention also preferably includes a plurality of other information associated with each geofence. Along with having the geofence, the geographic designators defining the geofence, and associated IP addresses, the geofence database of the present invention is operable to provide other useful information involved in the use of the geofences and corresponding IP addresses. For example, one embodiment of the present invention includes a geofence database with an owner name associated with the geofence. In another embodiment of the present invention, the owner contact information is associated with the owner name. The contact information preferably includes at least one of a phone number, an email address, and a mailing address. In another embodiment of the present invention, the database includes messaging functionality within the database itself, so that users can message other users and owners of geofences within the database platform. A country, city, town, postal code, street address, community, subdivision, township, other location defining information, and combinations thereof are preferably associated with the geofence in the database. The length of time that the geofence has been listed in the database is included in one embodiment of the present invention. Another embodiment of the present invention includes a length of time that the geofence has been verified in the database.

In one embodiment, a class associated with the geofence is listed in the database. Exemplary classes include residential, office, shopping malls, airports, arenas, train stations, and government buildings. Preferably, each class contains a plurality of subclasses that are optimized for zoom level, class, etc. Exemplary subclasses for arena use cases include concert arenas and sports arenas.

Licensees of the geofence (if any) are also preferably listed in association with each geofence within the geofence registry database. In the present invention, the term licensee refers to a person or entity who is granted a license (or entitlements) by the owner of the geofence to implement or have the opportunity to implement a license or entitlement to the geofence, to operate or manage the geofence, etc. Preferably, the licensee pays the owner of the geofence for the implementation and/or the opportunity for implementation. In one embodiment, users of devices within the geofence are bound by the entitlement or license automatically after entering the geofence. In another embodiment, users of devices within the geofence are bound by the entitlement or license after paying consideration. Preferably, the licensee obtains a license or an entitlement to the geofence in advance, or automatically via interactive licensing through Apps on the mobile device after discovery of the geofence(s), based upon the available entitlements and intended use of the geofence(s). In one embodiment use case, the entitlement includes a rule restricting content for devices located within the geofence. In another embodiment, the entitlement includes a rule enabling content for devices located within the geofence. In yet another embodiment, the entitlement includes a rule requiring content for devices located within the geofence. In one embodiment, the rule requiring content for devices located within the geofence depends upon a user of a device accepting an agreement for content to be displayed or installed on the device. In a further embodiment, the content is an advertisement. Preferably, the user is allowed to access additional content upon agreeing for the content to be displayed or installed on the device. Preferably, the entitlements are managed by a geofence entitlement manager, which is operable to activate the entitlement.

In one embodiment, App developers or app owners opt in for entitlements to be used in conjunction with their Apps.

There are many reasons licensees may wish to license a geofence and its corresponding IP addresses. By way of example, Gatorade is a corporate sponsor of the Atlantic Coast Conference (ACC). Therefore, Gatorade would probably prefer to block competitors' (such as Powerade) advertisements and offers at ACC events. Gatorade could therefore purchase a license to the geofence at the Dean Smith Center in Chapel Hill for beverage advertising. However, Geico, another corporate sponsor of the ACC, might also wish to advertise at the Dean Smith Center and block competitors' advertisements and offers. Since Gatorade and Geico are not direct competitors, each of them could purchase a license to advertise and block competitors' advertisements. In the geofence database, Gatorade would be listed as a licensee under a Beverages category whereas Geico would be listed as a licensee under an Insurance Provider category. Licensees are preferably grouped according to industry. If there is an opportunity to purchase a license for a particular geofence, this information is preferably listed in association with that geofence. Further information about the opportunity to purchase the license is preferably included as well, such as an asking price for the license, a duration for the license, a history of past licensees, and combinations thereof. In one embodiment, the licenses are exclusive license. Preferably the license is exclusive for one industry. In another embodiment, only one licensee is associated with the geofence. In another embodiment, the license is a nonexclusive license.

Notwithstanding present-day rules by FCC regarding net neutrality, the present invention also provides for advertising services which redirect devices from requested content to content defined by an owner or a licensee of the geofence. In one embodiment, a licensee or owner creates a rule that dictates what content is displayed in response to a user's Internet search on a device inside the geofence. Preferably, the rule is embodied as an entitlement in the present invention. The dictation of the content may determine what content is restricted from being accessed via the Internet within the geofence, as well as what content appears first in response to an Internet search. For example, if Coca Cola is the licensee of a geofence, Coca Cola would create a rule which states that any Internet searches for Pepsi do not display results associated with Pepsi, but only results associated with Coca Cola products. Additionally, in another embodiment, a rule is established that any attempts to reach a certain company's website are redirected to the website of the owner licensee or owner. For example, if Coca Cola is the licensee of a geofence, any attempts to access Pepsi's website are redirected to Coca Cola's website. In one embodiment, the licensee pays the owner each time Internet search results are redirected and/or each time attempts to reach a company's website are redirected to the licensee's website. In another embodiment, the user of a device can opt out of receiving certain advertisements or having searches redirected by paying a fee. Yet another embodiment of the present invention restricts the usage of certain applications or apps within the geofence. Another embodiment requires the usage of certain applications, apps, or content within the geofence as a condition to the device performing an action within the geofence.

One embodiment of the present invention provides a method for renting or buying various rights associated with the geofences and/or the IP addresses associated with the geofences. In another embodiment of the present invention, the geofence is listed for sale or rent in the database. For example, the NY Yankees may wish to sale outright their geofence rights associated with Yankee Stadium. The new owner would control the Internet rights, including Internet advertising rights, within Yankee Stadium. In another embodiment, the NY Yankees may only wish to rent the geofence rights associated with Yankee Stadium. The rights could be rented for any period of time. In one embodiment, the rights are rented for a term of years, a year, a month, a day, or even an hour. In another embodiment, the rights are rented for a season, a game, or even an inning. In one embodiment, the price of rental rights fluctuates based on the rental time period.

In a further embodiment, the rights to a geofence are operable to be bought on a per transaction basis by a pay-per-transaction licensee. In this embodiment, the pay-per-transaction licensee agrees to pay the owner or a licensee of the geofence for each transaction, i.e. each advertisement that is sent on their behalf and/or each advertisement or content that is blocked on their behalf. Preferably, the pay-per-transaction licensee submits desired rules to the owner of the geofence. In one embodiment, the pay-per-transaction licensee submits these rules to the owner of the geofence through the database. The owner of the geofence then accepts these rules and provides a rate on a per rule basis. In one embodiment, the pay-per-transaction licensee pays a retainer amount before the rules are applied. Each transaction that requires an amount to be paid is deducted from the retainer amount. In another embodiment, the pay-per-transaction licensee's rules are enforced via a credit arrangement, with the owner of the geofence sending the pay-per-transaction licensee a bill at predetermined or agreed time periods.

In another embodiment of the present invention, air rights are associated with the geofences. Air rights preferably include restrictions on drones and other flying machines in the airspace associated with the geofence, as well as entitlements, instructions, and requirements for drones and other flying machines within the geofence. Air rights also include entitlements, instructions, and requirements for devices on the ground with respect to drones and other flying machines. Preferably, these entitlements, instructions, and requirements are created and enforced through a fencing agent.

U.S. Pub. Nos. 2010/0044499 and 2014/0339355 and U.S. Pat. Nos. 8,052,081, 8,292,215, 8,753,155, and 8,991,740, each of which is hereby incorporated herein by reference in its entirety, describe unmanned aerial vehicles and related aspects.

U.S. Pub. Nos. 2008/0291318, 2014/0340473, 2015/0281507 and U.S. Pat. Nos. 6,844,990, 6,865,028, 6,885,817, 6,895,180, and 8,016,426, each of which is hereby incorporated herein by reference in its entirety, describe recording wide-angle images and more specifically panoramic images.

In one embodiment of the present invention, the entitlements (which may be construed as rules), instructions, and/or requirements relate to the functioning of a camera within a geofence and device functions relating to the functioning of the camera. Preferably, the entitlements, instructions, and/or requirements are embedded in the fencing agent. Preferably, the entitlements, instructions, and/or requirements are updateable by owner or licensee of the geofence in real-time. In another embodiment, the entitlements, instructions, and/or requirements depend upon the time of day, the day of the week, the weather, the temperature, and/or the time of year. Although the entitlements, instructions, and/or requirements are received by the device with the camera when the device is within the geofence, the instruction, entitlement, and/or requirement can include the device with the camera recording and/or detecting objects or classes of objects present within the geofence and/or present outside the geofence. Preferably, upon relocation to a different location in a geofence or to a location inside another geofence, the device with the camera automatically reconfigures itself and implements the entitlements, instructions, and/or requirements of the new location. Preferably, the entitlements, instructions, and/or requirements relating to the functioning of the camera within the geofence and device functions relating to the functioning of the camera can be updated in real-time or near real-time. In one embodiment, the device is a drone or a mobile tower.

In one embodiment, the entitlements, instructions, and/or requirements relate to blurring out, blacking out, distorting, or otherwise obstructing a portion of an object viewed by a camera, the entirety of an object viewed by a camera, or the entirety of an area viewed by a camera. Preferably, the camera is attached to a drone or a mobile tower. The obstructing could happen in real-time (i.e. when the camera is viewing the object or area) or in near real-time after the camera has viewed the object or area. The objects that can be obstructed include, but are not limited to, buildings (such as government buildings like the White House) and personal identifiers (such as license plates, faces, etc.). In one embodiment, entitlements, instructions, and/or requirements relating to obstructing objects or obstructing objects or areas for cameras on certain devices while allowing recording of those objects or areas for other devices. In another embodiment, rules obstructing objects or areas located in neighboring or nearby geofences are included in a geofence that does not contain the object or area. This could in effect provide for complete obstruction of an object or area for cameras in real-time for streams or near real-time in recorded footage such as videos or photos.

Another entitlement, instruction, and/or requirement relates to detecting a particular object or a class of objects in real-time or near real-time with a device having a camera. The object or class of objects can include any object, by way of example illegal drugs, weapons, animals (including human beings), and vehicles (including aircraft, boats, cars, trucks, trains, etc.). Upon detection of the object or class of objects, the device is preferably operable to send an image of the object or class of objects and/or an alert relating to the detection to another device. In one embodiment, the entitlement, instruction, and/or requirement includes a device detecting the presence of an object within a zone of a geofence and determining if the object is permitted to occupy the zone of the geofence. In another embodiment, the device is operable to focus on the object or class of objects and/or track the movement of the object or class of objects. In one embodiment, tracking the movement of the object or class of objects includes recording the position of the object or class of objects. Preferably, the recording of the position of the objects or the class of objects is performed every nanosecond, millisecond, microsecond, second, or fraction thereof. The position of the objects or class of objects is preferably recorded as an IP address, IPv6 address, latitudinal/longitudinal coordinate, or as a distance from the position of the camera or device.

Notably, the object or class of objects detected and/or tracked by the device may be smart devices which interact with the device and/or the geofence. However, in one embodiment, the object or class of objects detected and/or tracked by the device do not include wireless connectivity or GPS functionality. In a further embodiment, the object or class of objects detected and/or tracked do not include electronics. In yet another embodiment, the object is detected and/or tracked by the device with the object not emitting any man-made or artificial signals and/or without using any artificial or man-made signals emitted by the object. Preferably, the object is detected and/or tracked by the device using infrared (IR) technology or radar.

Yet another embodiment of the present invention provides for the device scanning the ground, sky, and/or underground inside the geofence for objects. Alternatively, the device scans the ground, sky, and/or underground outside the geofence or inside and outside the geofence for objects. In one embodiment, the device scans the ground, sky, and/or underground around the perimeter of the geofence. In another embodiment, the device scans the ground, sky, and/or underground in a predetermined pattern. The predetermined pattern is defined by a plurality of geographic designators or IP addresses in one embodiment. In another embodiment, the device scans the ground, sky, and/or underground in a randomized pattern.

In another embodiment, the entitlement, instruction, and/or requirement relates to movement of the device inside the geofence or patrolling of the device inside the geofence. In one embodiment, the device is instructed to move around the perimeter of the geofence. In yet another embodiment, the device is instructed to move along a predetermined pattern within the geofence defined by IP address (preferably IPv6 address) coordinates. Another embodiment provides for the device to move in randomized patterns within a geofence. Other embodiments provide for the device to move across multiple geofences, automatically obtaining any new rules for movement within the new geofences for the new geofences entered, preferably via the fencing agent from the geofence registry. The device emits a sound, light, vibration, smell, or other stimulus while patrolling in one embodiment, or emits a sound, light, vibration, smell, or other stimulus upon detecting of an object in another embodiment. This patrol mode is useful to deter animals or humans from entering the geofence, keeping animals or humans in a geofence, or encouraging humans or animals to enter the geofence.

In one embodiment, the device includes a reader such as a microchip reader, an RFID reader, an NFC reader, and/or a smart chip reader. In one embodiment, and based on the entitlements, requirements, and/or instructions given to the device, preferably through the fencing agent, the device is operable to approach an object or animal containing a chip and read the chip. By way of example, if the animal is a pet that has strayed into the geofence and has a microchip, the device is operable to scan the microchip and alert an owner of the animal of the pet's location in real-time or near real-time.

In yet another embodiment, the device with the camera is operable to detect presence of fire, flooding, wind, earthquake, or any other natural disaster and respond by issuing an alert and/or taking countermeasures to the natural disaster.

In another embodiment, upon the device including the camera detecting an object or a class of objects, an entitlement, instruction, and/or requirement for the device causes the device to approach the object of the class of objects. Preferably, the approach is begun in real-time upon the detection of the object or the class of objects. The approach preferably includes taking photographs or video of the object. In one embodiment, the approach is defined as the device within the camera coming within a predetermined proximity of the object or the class of objects and maintaining the proximity to the object or class of objects. In another embodiment, the approach includes attempting to neutralize the object or class of objects through destruction of the object or class of objects or quarantine of the object or class of objects. In yet another embodiment, the approach includes taking protective actions relating to the object, guiding the object to a location within the geofence, or picking up the object.

The term camera includes standard digital and non-digital cameras recording visible light as well as IR cameras, UV cameras, night vision cameras, thermal imaging cameras, x-ray cameras, gamma ray cameras, radio wave cameras, microwave cameras, radar, ultrasound, and any other imaging systems.

In another embodiment, the entitlements, requirements, and instructions relate to detecting activity by people or other devices within a geofence. The activity could include a person entering an area of a geofence, such as the person entering a door or window of a building (by breaking in or by using a key) or a person entering a restricted area, such as walking on the grass. Identification of the person could be performed by determining the identity of a device carried by the person, by way of example, by sending a request for identification to the device, or by a retinal scan of the person's eye(s). There could be an entitlement, requirement, or instruction for the device to track the movement of the person after the person has performed a certain activity, such as by following that person within the geofence and beyond the geofence. In one embodiment, the fencing agent within the geofence where the detection occurred includes instructions to ignore the fencing agents of other geofences if the device leaves the geofence where the detection occurred and to continue operation according of the fencing agent of the geofence where the detection occurred if the geofence where the detection occurred includes a class or precedence higher in authority than the other geofences.

In another embodiment of the present invention, entitlements, requirements, and instructions relate to the angle of images recorded. Exemplary angles include 180 degrees and 360 degrees. Preferably, the 360 degrees angle images are created using a continuous circle 360-degree view in real-time or near real-time. In another embodiment, the 360 degrees angle images are created using multiple cameras, each having a different view of the desired area to be filmed. In one embodiment, the device automatically creates a corrected image from the multiple cameras. The 360-degree or 180-degree view includes a real-time stream in one embodiment. In another embodiment, the 360-degree or 180-degree view includes taking photographs in predetermined intervals, wherein the predetermined intervals include every second, 5 seconds, 10 seconds, 30 seconds, minute, 5 minutes, 10 minutes, 15 minutes, 30 minutes, hour, 2 hours, 4 hours, 8 hours, 12 hours, day, and combinations thereof.

Another entitlement includes trigger entitlements for accurate device control. Trigger entitlements include location-based trigger entitlements. By way of example, photos and/or videos and/or audio recording taken within a geofence could be uploaded to a common folder. In one embodiment, the uploading is automatic and is mandatory. Preferably, the automatic uploading occurs in real-time or near real-time. However, in another embodiment, a user of the device is given an option to upload a photo upon taking the photo. Preferably, the location-based trigger entitlements are specified for a certain time period, such as the duration of an event. In another embodiment, the location-based trigger entitlements last in perpetuity. Other location-based trigger entitlements include uploading data sent from a device or created by a device within a geofence such as text messages, phone calls, voice data, health indicators (blood pressure, heart rate, etc.), emails, locations of the device within the geofence (recorded in nanosecond, millisecond, microsecond, second intervals, or fractions thereof), monetary transactions performed within the geofence, viewing history within the geofence, and/or time spent within the geofence. Data received by a device including text messages, phone calls, voice data, emails, and/or monetary transactions performed within the geofence are uploaded in another embodiment of the present invention.

Preferably, operational rules for the geofence are associated with each geofence in the database. The operational rules define the permissions and restrictions (or entitlements) on wireless activities within the geofences. In one embodiment, the permissions and restrictions (or entitlements) are determined by one or more licensees. In another embodiment, the permissions and restrictions are determined by the owner. In one embodiment, the permissions and restrictions are listed in the database so that they are visible to users of the database. In another embodiment, only certain user-selected permissions and restrictions (or entitlements) are listed in the database so that they are visible to users of the database.

In one embodiment of the present invention, the geofence database is updated at predetermined time intervals. Preferably, the geofence database is automatically updated. Another embodiment of the present invention provides for manually or automatically updating ownership and/or licensee information upon a new ownership and/or license agreement.

Preferably, the database is sortable by location, class, verified or nonverified status, entitlements, time-to-live values, context summaries, owner, licensee, email address, and combinations thereof.

In another embodiment, the database is searchable. Preferably, all fields displayed to users of the database are searchable, including fields relating to location, class, verified or nonverified status, owner, licensee, email address, and combinations thereof. Additionally, preferably a search option exists for a user of the database to search for all geofences within a certain distance of a location. Preferably, a feature of the database includes an option to display all geofences within a certain distance of the user's current location.

In a further embodiment, the invention provides a Wi-Fi finder app to be used on a device in conjunction with the geofence database. Preferably, the Wi-Fi finder app searches the geofence database and finds Wi-Fi access points located near a location. In one embodiment, the location is the current location of the device. Preferably, the device is a mobile device. In a further embodiment, the device automatically searches for Wi-Fi access points located near the location of the device.

In one embodiment, the database is accessible through a computer. In another embodiment, the database is accessible through a mobile phone. Preferably, the database is accessible through an app on the mobile phone.

Electronic Device Preferences

One embodiment of the present invention involves creating a list of device preferences within the geofence database. Preferably, the device preferences include information relating to the device and the user of the device, including demographic characteristics such as age, sex, and family status as well as preferences for certain products or services. Preferably, the preferences for certain products or services are preferences that stretch across industries. In one embodiment, the licensee pays a fee to obtain access to preferences that are not within the licensee's business or industry. By way of example, if Coca Cola is the owner or licensee of the Yankee Stadium geofence, it desires to maximize the sale of all its brands. Thus, instead of sending generic Coca Cola advertisements to all users in the geofence, device and user preferences would dictate which brand advertisements are sent to which user(s). A young mother or a user who has indicated a preference for Minute Maid juice would be more likely to receive an advertisement for Minute Maid instead of Coca Cola. Someone who has expressed a preference for health products would be more likely to receive advertisements for vitamin enhanced water, or another "healthier" brand of Coca Cola.

In another embodiment of the present invention, a list of devices permitted to access the Internet within a geofence is associated with the geofence in the geofence database. An administrator, owner, or licensee of the geofence grants access in one embodiment. In another embodiment, a user of a device requests access and access is automatically granted based on the user's acceptance of an agreement or terms relating to the access. In another embodiment, a list of devices prohibited from accessing the Internet within a geofence is associated with the geofence. In a further embodiment, the database of the present invention is updated in real-time or near real-time and includes a list of the number and identity of devices currently using the Internet within the geofence. In another embodiment, the database includes a list of the number and identity of devices that have used the Internet within a predetermined time period, such as the last hour, last day, last week, or last year.

Analytics

One embodiment of the present invention relates to providing analytics for geofences and the corresponding IP addresses. Preferably, the analytics are accessible through the database. In one embodiment, analytics include determining a number of devices which have accessed and/or attempted to access the Internet within a geofence for a particular time period or overall. Another embodiment includes determining the number of advertisements that have been sent to devices within the geofence. Preferably, the number of advertisements is further sorted into the number of advertisements sent on behalf of the owner and licensees. The number of advertisements preferably includes a breakdown of the number of each type of advertisement sent and the number of a particular advertisement sent. Additionally, the present invention provides for analytics relating to the number of advertisements blocked within the geofence and/or the number of redirected searches within the geofence. In another embodiment, the present invention includes statistics relating to the volume of sales of a product or service within the geofence. Preferably, the product or service is a product or service sold by the owner or licensee of the geofence. In another embodiment, the product or service is a product or service sold by the competitor of the owner or licensee of the geofence. In another embodiment of the present invention, the analytics include analytics relating to the number of offers distributed by a licensee or owner of the geofence and the number of those offers accepted by users of devices within the geofence. In yet another embodiment of the present invention, the analytics include analytics relating to how many times individual devices have entered the geofence, an average duration for the time spent by the device in the geofence, and combinations thereof.

Geofence Classes

Geofences are created to serve different intents with different functionalities. Geofences can be created for residential properties with control and management and surveillance functionality. In one embodiment, such a geofence will block drones flying across into the territory of this residential property. In another embodiment, vehicles equipped with communication systems, when entering or leaving the residential property geofence, will trigger a notification to the owner. In yet another embodiment, people with mobile devices can trigger notifications to the owner as well so that the owner knows who they are, friends, relatives, neighbors, or intruders.

Geofences can also be created at business locales for fair competition and management. In one embodiment, customers in a first pizza shop cannot receive advertisements or coupons from a second pizza shop across the street due the control of the geofence for the first pizza shop.

Geofences can also be created for public or private schools for the purpose of protection. In one embodiment, unwanted information and advertisements are block out of the school territory for the safety reason. In another embodiment, a school geofence can recognize unauthorized persons entering the geofence if there is a mobile device with them so as to take further actions.

Although geofences have traditionally been stationary, a strong need exists for creating mobile geofences. These geofences are defined as a polygon or a shape around a mobile object, such as a vehicle, plane, or boat. Additionally, the mobile geofences are defined centrally with respect to the object, by a beacon or other indicator located in the object in one embodiment. Rules for mobile geofences preferably relate to advertising within the mobile geofences. In one embodiment, rules for the mobile geofences relate to functionalities of devices within the mobile geofences. In one embodiment, a rule prohibits text messaging within a mobile geofence around a vehicle. Another example of an embodiment prohibits advertising by a competitor. An example would be prohibiting advertisements relating to a competitor's cruise ship within the mobile geofence of a particular cruise ship.

A further embodiment of the present invention includes permanently prohibiting advertising in a mobile geofence based on a brand of the mobile object. For example, a Toyota would include a mobile geofence which prohibits advertising by Ford, Chevrolet, BMW, etc. within the Toyota.

Geofences can also be created on certain highway sections, busy intersections, and high accident locations for safety management. In one embodiment, when moving vehicles are within such geofences, all the mobile devices are disabled for texting, website browsing, calling except emergency calls.

Preferably, vehicle makers and application developers opt in geofence functionalities as a standard to provide customers safer and more flexible experiences.

Fence Delivery Network

Fundamentally, the present invention relies on a coordinate system based on IP addresses, where an IP address, preferably an IPv6 address, is used to describe an exact point on earth on micron level. Traditionally, a coordinate point with a longitude value and a latitude value is used to describe a geographic point on earth. However, with the present invention, an IP address is also associated with a geographic point. The IP address and coordinate point can be converted to each other for related lookups. Preferably, the IPv6 address is only used to determine the anchor point associated with the geofence(s). A single anchor point is computed independently when the lat/long is automatically converted to an IPv6 address for the ROI anchor point; this is the only time the IPv6 address is used within the systems and methods of the present invention. The constituent points of fence geometry are also expressed in IP addresses. The ROI anchor and fence anchor are the only uses of DNS queries.

A method for querying a database of registered geofences is disclosed. A request associated with an IP address is received by a server/processor. The IP address is converted to an anchor point of geographic location within the ROI in the processor. One or more geofences having respective geographic areas that overlap with the anchor point identified. The request is a DNS query and accordingly, the response a DNS response. Information describing the identified geofences is encoded in the IP addresses and the list of fence IP address points are returned in the DNS response. The information includes an indication whether a particular geofence is verified or unverified, a class of the identified geofence, an entitlement of the geofence, a time-to-live value related to the geofence, and metes and bounds of the geofence, which together provide the information about the registered geofence and its intended use(s) as registered by the owner of the geofence (i.e., the entitlements provide the intended use information). In one embodiment, a user device is location-aware, which means that a user device is able to determine its own location by use of relevant technology, such as GPS, iBeacon, Wi-Fi and etc. The user device independently converts a coordinate point describing its location (lat/long automatically determined by the device location services) to an IP address, preferably IPv6 address. A fence delivery network comprises a server and one or more geofence databases communicating over network with a fencing agent (FA) contained within or operable within an App on a device (or otherwise programmed for operation on the mobile device). A geocoder module or an IP-Coordinate converter in the server performs the conversion between an IP address to a coordinate point of a geographic location. A search/query module in the server queries one or more geofence databases. The one or more databases can be centralized or decentralized. The server can be centralized or decentralized. In one embodiment, the fence delivery network includes a Graphical User Interface (GUI). Preferably, the GUI is configured to receive a request and display a response. In one embodiment, the request comprises an IP address. In a further embodiment, the request is a Domain Name System (DNS) query. Preferably, the response includes information describing one or more identified geofences. In one embodiment, the information describing the one or more identified geofences comprises at least one of an indication whether the geofence is verified or unverified, a class of the one or more identified geofences, an entitlement of the one or more identified geofences, a time-to-live value, and a context summary of the one or more identified geofences. In another embodiment, the GUI comprises an interactive map showing the boundaries of the one or more identified geofences. Preferably, the interactive map is a 2-dimensional (2D) map. In yet another embodiment, the fence delivery network is a system. Preferably, the system includes an application program communicating with the at least one server and the at least one geofence database via the network, wherein the application program is installed in at least one mobile computing device. This fence delivery network a very robust system that supplies every internet connected device with IP/Coordinate and Coordinate/IP mappings in a very distributed, redundant and fault tolerant way.

Visualization

A Graphical User Interface is used for geofence registration, lookup and permissions.

Registration GUI

According to one embodiment of the present invention, a user registers a geofence via a geofence registration GUI. Preferably, the geofence GUI includes a map. In one embodiment, the user defines the geofence on the map. In a further embodiment, the user defines the geofence on the map by outlining the perimeter of the geofence on the map. In another embodiment, the user defines the geofence on the map by indicating the location and the range of the beacon on the map. In yet another embodiment, the user enters a street address associated with a geofence and the associated real property boundaries of the geofence are automatically drawn onto the map. In another embodiment, the first request, the step of converting the coordinate point to the IP address, the IP address, and/or the information describing the one or more identified geofences are displayed via the GUI.

Lookup and Permission GUI

With a geofence query GUI, a user can search on metadata and certificate details, since neither the stakeholders using the GUI nor the app developers are aware of the IP addresses. There is another button "geofence search", it will pull up all the identified geofences related to the IP address and the associated geofence information. Search terms like "verified, active, Amazon, drone, barking" (by way of example and not limitation) would yield a set of fences with a visual depiction of their geometry on the map. Preferably, the map is interactive.

In another embodiment, the interactive map is a 2D interactive map, it shows the boundary of each identified geofence and a label indicating some of the geofence information, such as verified or unverified, entitled or not, and a summary of the data content within the geofence. This 2D interactive map provides a visual overlay or comparison of IPv6 addresses and geographic coordinate points with high resolution. In other embodiments, a 3D interactive map may be used to provide for global coverage.

In one embodiment, the map of geofences is color coded. Preferably, geofences are coded by color according to at least one of a class, a permanent or temporary status, an owner status, a licensee status, usage statistics, verification status, precedence, etc. In one embodiment, the map is accessible via a mobile device. In a further embodiment, the map is operable to be accessed and manipulated using a touch screen. In one embodiment, a user clicks on an area on the map associated with a geofence to request access to the geofence.

In one embodiment, a desktop computer with internet connection can be used to perform the query via this GUI. In another (preferred) embodiment, a mobile device with an application installed is used to perform the query. In this embodiment, there may be a "connect" or "enter" button for a geofence. Once the mobile device will have interactions with the selected.

Messaging/Notification

One embodiment is that a user/a user's mobile device searches available geofences and related information, and then the user selects which one he wants to connect or enter. Once the user hits "enter" button for a specific geofence, there will be interaction between the mobile device and the specific geofence server.

There may be "terms and conditions" for the geofence entrance, for example, that geofence server has access to your mobile device and collect data, certain laws and rules are enforced within the geofence, and etc. Geofences may be free or fee required to enter. If there is a certain fee, payment page is transmitted to the mobile device. Once the user accepts the terms and conditions and pays the fee if required, the user/mobile device is allowed to enter the geofence via a notification. This way, the user/mobile device can receive information this specific geofence has. There may be different levels of fees and bases on the fee level, based on the fee level, there are different levels of information access for the users, such as basic, premium, enterprise and etc. A user/mobile device may enter more than one geofence at the same time. There are entrance procedures similar to the above description.

Another embodiment is that once the user/a user's mobile device physically is within certain geofences, there are notifications popping up, similar to the Wi-Fi alert on the user's mobile device if the Wi-Fi is on. At this time, the user/mobile device can still query the geofence database to get more information about the available geofences and then decides which geofence(s) to enter.

In another embodiment, the mobile device may be admitted to certain geofences automatically once it is within the boundary of those geofences. In some circumstances, the user/mobile device may receive unwanted advertisements or other annoying information or services, the user has the option to exit or block those geofences, or block receiving certain information. Preferably, the fence delivery network application installed mobile device can identify "obnoxious" or unsecure or junk geofences and display warnings or notifications to the user as a kind of location-based service.

In one embodiment, the present invention is directed to a global aerial vehicle registry, that leverages the existing global internet infrastructure to meet goals of scalability, reliability, a neutral global management structure while maintaining sovereignty over national airspace management and private information.

A unique registration ID is assigned for each Unmanned Aerial (UA) airframe, remote pilot/ground control, and, optionally, each autopilot component. The global registry infrastructure is comprised of standard Internet resources and authority delegated by Internet Corporation for Assigned Names and Numbers (ICANN), with supporting services included in U.S. patent application Ser. Nos. 14/811,234, 15/213,072, and 15/225,433, each of which is incorporated herein by reference in their entirety, including specification, claims, abstracts, and figures.

Each registration for at least one geofence exists as a domain record leveraging the Domain Name System (DNS). At least one record about each registration for the corresponding at least one geofence and/or at least one Unmanned Aircraft (UA) airframe is stored in at least one database to provide a global registry system. In one embodiment of the present invention, the records about each registration that are stored in the global system (versus the in-country Civil Aviation Authority (CAA) system) determined by a collaborative process, such as by way of example and not limitation, by International Civil Aviation Organization (ICAO). In addition to a unique Global ID for the at least one geofence and/or each UA airframe, encrypted authorizations are stored in the DNS record to facilitate cross-border operations for Unmanned Aerial Vehicles (UAVs) and/or for manned aerial vehicles. Other established standard internet resources applied to this solution include Domain Name System Security Extensions (DNSSEC) and DNS-based Authentication of Named Entities (DANE). DANE is operable to establish and distribute a secure identity for an Unmanned Aircraft System (UAS), operators and parties to airspace authorizations and waivers without UAS stakeholders having any knowledge of or responsibility for cryptographic keys.

A neutral global industry association or standards body can function as a Registration Authority (RA) for UA registration records and corresponding data stored in the at least one database. This RA will also act as the trust "anchor" in the DNSSEC chain of trust. The RA will subsequently delegate its authority to CAAs for management of the registration in their country. DNSSEC facilities are provided for establishing delegate RAs as well as authority verification services. Aerial vehicles, manned or unmanned, are registered periodically.

This global UA registry system can be deployed to meet emerging country security and privacy requirements. The broadcast of the Global ID enables assured identification, but not necessarily guarantees access to the details of that identification. In one embodiment, the process for access is defined as appropriate within the laws of the country of registration for inquiries within the country, and by standard global agreement for cross-border incidents and inquiries. For example, local law enforcement may have immediate access or may require court approval.

The global registry system in the present invention is deployed by leveraging the existing infrastructure and the existing global Internet management model, including local State controls. In one embodiment, Virtual Machine (VM) instances are provided suitable for use in public or private cloud for Civil Aviation Authorities (CAAs) and other stakeholders who want to become an RA.

The global registry system in the present invention has ID and Position Tracking capability providing an Automatic Dependent Surveillance-Broadcast (ADS-B) alternative but requiring no network connection, no new hardware, and has a minimal power budget. The present invention enables UA traffic to broadcast all ADS-B fields plus UA-specific fields, such as battery life, command and control states such as Return to Home, Authorization IDs, etc. It enables continuous ID and monitoring of UA traffic alongside ADS-B traffic using GDL 90 compatible systems. It further enables retransmission of data broadcast (ADS-R) to manned aircraft via UAT978.

The broadcast enables 3 key outcomes: (1) Other aircraft (manned or unmanned) in the local area are provided with vital information for collision avoidance; (2) CAA ground infrastructure receives information for both real time air traffic control (ATC) and for compliance and investigative purposes; (3) Local authorities may easily monitor locally relevant UA traffic for safety and compliance purposes.

A unique coordinate system disclosed in previous invention by Applicant maps all the Earth's space, including air, sea and land, with location points a cubic centimeter in size, including subterranean and sub-oceanic space. Each point in space is associated with an IPv6 address in a highly structured fashion. As each physical space is modeled with a 2D plane or 3D volume, IP supernets and subnets take shape.

Even in GNSS-impaired environments, the present invention provides location by ranging off other devices. Due to the logical deployment of the IPv6 network addresses, if any device knows its location, any other UA or device can determine its exact location through range finding techniques.

In one embodiment, a software-defined Multi-Band Spatial Broadcast (MBSB) transponder is implemented on an unmanned aerial vehicle (UAV). The UAV is operable to continuously broadcast its identification (ID), position, and position certainty. Preferably, this continuous broadcast of its ID, position, and position certainty is conducted over the Industrial, Scientific, and Medical radio band (ISM band) leveraging onboard Wi-Fi radio without interfering with other UAVs' Wi-Fi signals. MBSB ground stations for CAAs are deployed at airports and existing ground monitoring locations. The MBSB ground stations include antenna systems operably connected to a CAA network, which enable real-time visibility to air traffic control (ATC) at a given airport and leverage existing CAA secure communications and storage for centralized preservation of UAV flight information. Furthermore, very low cost MBSB fixed or mobile stations are implemented for local authorities with a desired monitoring range.

In one embodiment, the systems and methods in the present invention do not require network connection. CAAs can specify sensitive and/or high congestion airspace where an LTE connection is required, and provide UAVs not meeting minimum communication requirements for that airspace out of specific geofences.

The systems and methods of the present invention described herein for UAVs also provide an integrated operations model with ground and/or waterborne vehicles. Any vehicle may be configured with an MBSB transponder (or the simpler MBSB beacon), enabling an integrated view and management of this traffic for ground operations. Ground and waterborne vehicles broadcast different ID types and can be filtered as needed by monitoring systems.

Another benefit of using an MBSB transponder or beacon is that equipment and/or users of low airspace, by way of example and not limitation, helicopters, emergency services, parachuters, etc., can broadcast a 'safety perimeter' around themselves, i.e., a mobile geofence. The mobile geofence preferably operates similarly to fixed geofences described hereinabove and may be registered within a geofence registry database and recognized by fencing agents according to the present invention. When other MBSB-enabled UAV encounter a mobile geofence, automated collision avoidance rules are activated that provide for automatic UAV avoidance within predetermined safety parameters, i.e., it is interpreted as a "no-fly" zone for collision avoidance purposes.

In one embodiment, Communication and Control links (C2) adopt IPv6 with link-local scope at the minimum and employ service discovery via mDNSv6 and similar protocols. This adoption of IPv6 in the C2 systems with the present invention enables light-weight mesh and personal area protocols such as IPv6 over Low-Power Wireless Personal Area Networks (6LoWPAN).

The geofences in the present invention provide not only the precise geometry boundaries, such as airspace, but also include the rules of behavior and important information for those UAVs and any other vehicles approaching, entering, or occupying the airspace. When the UAV approach a geofence, it receives communication or other transmission of information including Time to Breach Fence, Distance to Breach Fence, and/or Vectors to Evade Fence. The geofences constructed and configured according to the present invention also enable simple restrictions such as "No Fly" zones of a national airspace, and enable granular rules and permissions, by way of example but not limitation, limit entry to UAVs with minimum capabilities, such as ability to connect to a network for navigating a congested airspace; permit airspace entry but at restricted speed or a specified altitude; restrict entry if battery life is insufficient to successfully exit; permit airspace entry to UAVs under a specific weight; and restrict entry during specified hours of day except for authorized UAVs.

The geofences are deployed via a global Fence Delivery Network in the present invention to cache on edge servers and routers throughout the world, and ultimately cache on the UAVs themselves. UAVs with the MBSB transponder capability recognize and cache relevant geofences and automatically comply with the rules.

Geofences in the present invention are delivered via IPv6 addresses, optimized for caching on UAVs. With each geofence, the size of a compact DNS record has minimal memory usage on an UAV. Further, because geofence information is cached onboard, there is no requirement for constant connectivity. Thus, the present invention provides a reliable solution despite network coverage and minimizes the data usage and power for the UAV.

In one embodiment, a national airspace database, including boundaries and flight restrictions for a multiplicity or for all classes of airspace, is ingested and deployed with associated rules that are communicated to and actionable by UAVs.

The present invention is not limited to the national airspace. As UAVs become more pervasive in societies, there is a need for intelligent management of space at a much more local level, which is also addressed by the present invention systems and methods described herein. Local municipalities and property owners can create and publish their own geofences. For example, but not for limitation, municipalities can designate a park off limits to drones below a certain altitude or create special drone corridors for delivery services; once created, the geofence is registered and its information is communicated by fencing agent to the UAVs in proximity to the geofence. In another example, a municipality or property owner can restrict low altitude flight over certain areas, for example, making the restriction to any UAVs except to its own authorized fleet. Also for example, but not for limitation, for safety and liability reasons, parents can create a fence specifically and only for their child's drone, limiting its flight to daytime, in the park, within specified elevations, and/or at a limited speed. Thus, the geofences are created with predetermined or with custom details, including the geofence shape, height (3D) restrictions, time of day limitations, UAV-specific provisions, etc.

The present invention also provides a hierarchical enforcement of geofences that mirrors the hierarchical authority established in the physical world. In any given space, multiple geofences may apply to a UAV (CAA airspace, municipal authority, private property owner) and the hierarchical priority of rules and permissions are enforced.

The systems and methods in the present invention has minimal Design Impact on UA: No weight and no bulk (no incremental hardware requirement for UA with existing Wi-Fi radio); and minimal power budget (low power transmission, no required network connection) so no new battery demands. The MBSB transponder requires integration with the Airborne Collision Avoidance System (ACAS), Autopilot, Flight Control Unit (FCU) and Inertial Measurement Unit (IMU) to enable these capabilities. For UA with no current transmission hardware, a simple small-form and lightweight RF device can be attached.

The present invention provides a comprehensive global platform for the registry, delivery, and management of data-enhanced geofences, which is built on the unique Coordinate System for efficiency in defining and communicating precise location-based information across the global internet infrastructure.

The previously described Registration Authorities (RAs) also acts as the registrar of geofences, manage geofences within their State or political boundaries, and provides the tools for defining 2D/3D geometries (air, ground or sea), managing ownership of those geometries, and assigning rules and important information for users of that space. These capabilities are enabled within proprietary systems. Existing properties, geospatial boundaries, and even rules of space can be ingested into the systems in the present invention.

In one embodiment, geofences can be defined and updated within minutes, published for local caching and consumption. These geofences include temporary flight restrictions and notices. These geofences can also include local permanent and temporary geofences and rules, defined and managed by municipalities and other authorities. It can further enable (where relevant in a country), the individual or business property owner geofences. Geofences are delivered to locally relevant edge routers and towers by the Fence Delivery Network and ready for caching onboard the UA itself.

In one embodiment, the global UA registration system in the present invention provides encryption for cyber security considerations and it is globally accessible when crossing national borders.

Compliance is placed upon the manufacturers of the UA. If the UA has the MBSB transponder integrated as described above, there is no additional effort for the UA to comply with geofences. Compliance for the normal citizen/user is automatic. The DIY market and illegal modifications to UA to avoid compliance are always an inherent risk, but this is through overt action.

DETAILED DESCRIPTION OF THE FIGURES

Referring now to the figures, they are provided for illustration of the present invention and are not intended to limit the claims thereto.

FIG. 1 is a schematic diagram of an embodiment of the invention illustrating a computer system, generally described as 800, having a network 810, a plurality of computing devices 820, 830, 840, a server 850 and a database 870.

The server 850 is constructed, configured and coupled to enable communication over a network 810 with computing devices 820, 830, 840. The server 850 includes a processing unit 851 with an operating system 852. The operating system 852 enables the server 850 to communicate through network 810 with the remote, distributed user devices. Database 870 houses an operating system 872, memory 874, and programs 876.

In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 is implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random-access memory (RAM) 864 and a read-only memory (ROM) 866, and a system bus 868 that couples the memory 862 to the processor 860. In another embodiment, the computing device 830 additionally includes components such as a storage device 890 for storing the operating system 892 and one or more application programs 894, a network interface unit 896, and/or an input/output controller 898. Each of the components is coupled to each other through at least one bus 868. The input/output controller 898 receives and processes input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 is a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 1, multiple processors 860 and/or multiple buses 868 are used, as appropriate, along with multiple memories 862 of multiple types (e.g., a combination of a DSP and a microprocessor, a plurality of microprocessors, one or more microprocessors in conjunction with a DSP core).

Also, multiple computing devices are connected, with each device providing portions of the necessary operations (e.g., a server bank, a group of blade servers, or a multiprocessor system). Alternatively, some steps or methods are performed by circuitry that is specific to a given function.

According to various embodiments, the computer system 800 operates in a networked environment using logical connections to local and/or remote computing devices 820, 830, 840, 850 through a network 810. A computing device 830 is connected to a network 810 through a network interface unit 896 connected to the bus 868. Computing devices communicate communication media through wired networks, direct-wired connections or wirelessly such as acoustic, RF or infrared through an antenna 897 in communication with the network antenna 812 and the network interface unit 896, which includes digital signal processing circuitry when necessary. The network interface unit 896 provides for communications under various modes or protocols.

In one or more exemplary aspects, the instructions are implemented in hardware, software, firmware, or any combinations thereof. A computer readable medium provides volatile or non-volatile storage for one or more sets of instructions, such as operating systems, data structures, program modules, applications or other data embodying any one or more of the methodologies or functions described herein. The computer readable medium includes the memory 862, the processor 860, and/or the storage media 890 and is a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further transmitted or received over the network 810 via the network interface unit 896 as communication media, which includes a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that are used to store the computer readable instructions and which are accessed by the computer system 800.

It is also contemplated that the computer system 800 does not include all of the components shown in FIG. 1, includes other components that are not explicitly shown in FIG. 1, or utilizes architecture completely different than that shown in FIG. 1. The various illustrative logical blocks, modules, elements, circuits, and algorithms described in connection with the embodiments disclosed herein are implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application (e.g., arranged in a different order or partitioned in a different way), but such implementation decisions should not be interpreted as causing a departure from the scope of the present invention.

Figure 2:
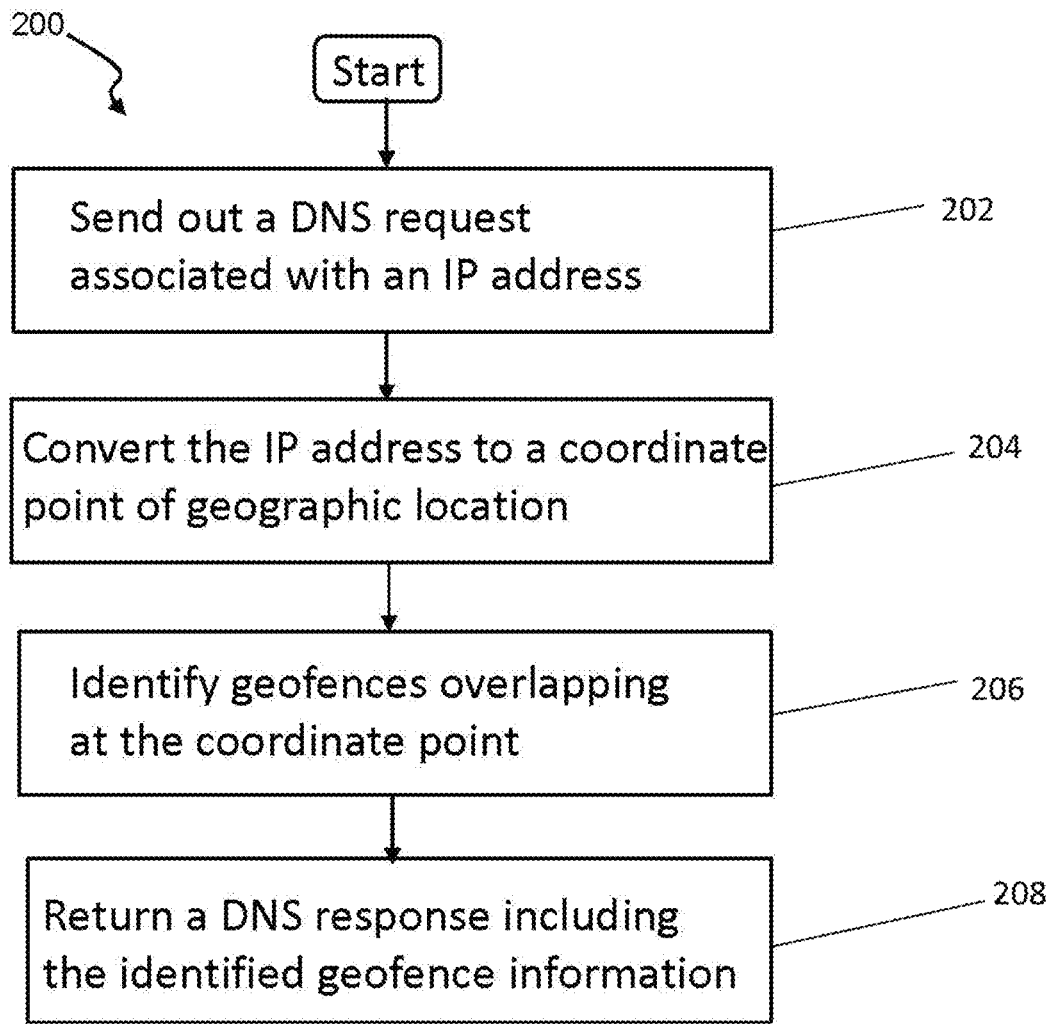
FIG. 2 is a flowchart for delivering geofence information based on a request.

FIG. 2 is a flowchart for delivering geofence information based on a request. A user sends out a DNS request associated with an IP address 202. A server converts the IP address to a coordinate point of geographic location and queries a geofence database 204. Then one or more geofences overlapping at the coordinate point are identified 206. The server then returns a DNS response including information describing the identified one or more geofences 208.

Figure 3:
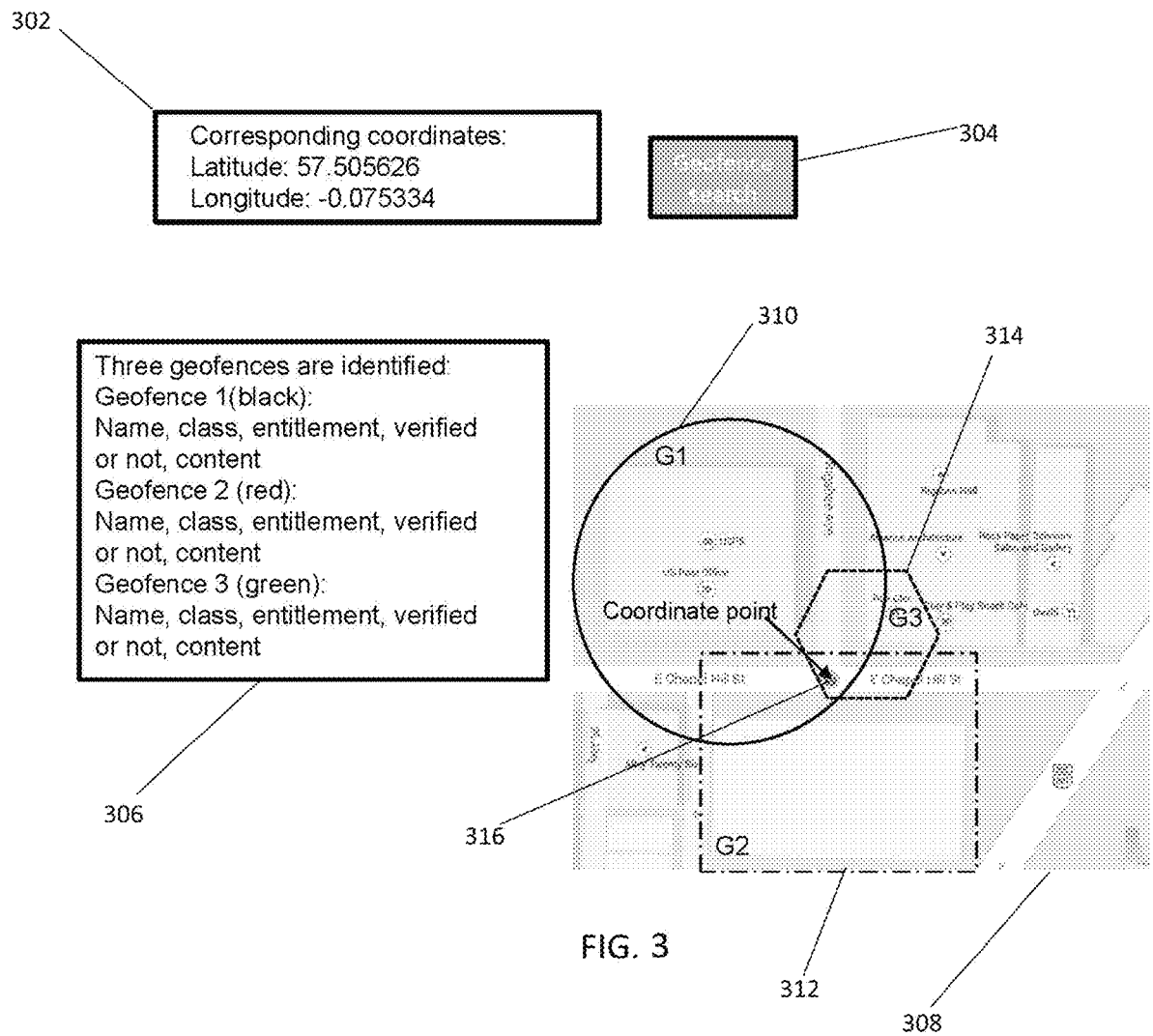
FIG. 3 is one embodiment of a graphical user interface (GUI) for a latitude/longitude geofence search, showing a list of geofences and corresponding information.

FIG. 3 is an embodiment of GUI for the geofence delivery network. A user enters latitude and longitude values in a box on the GUI 302, and then selects the button "Geofence search" 304. Then, all the identified geofences are identified and listed on the GUI with corresponding information 306. There is also an interactive map displaying the identified geofences 308. In this illustrated example, there are three geofences identified. Their name, class, entitlement, verification, and content information are displayed accordingly. In the interactive map, boundaries of the three geofences G1 (black) 310, G2 (green) 312, and G3 (red) 314 are differentiated with different line types. Meanwhile, the converted coordinate point 316 is also noted in the map.

Figure 4:
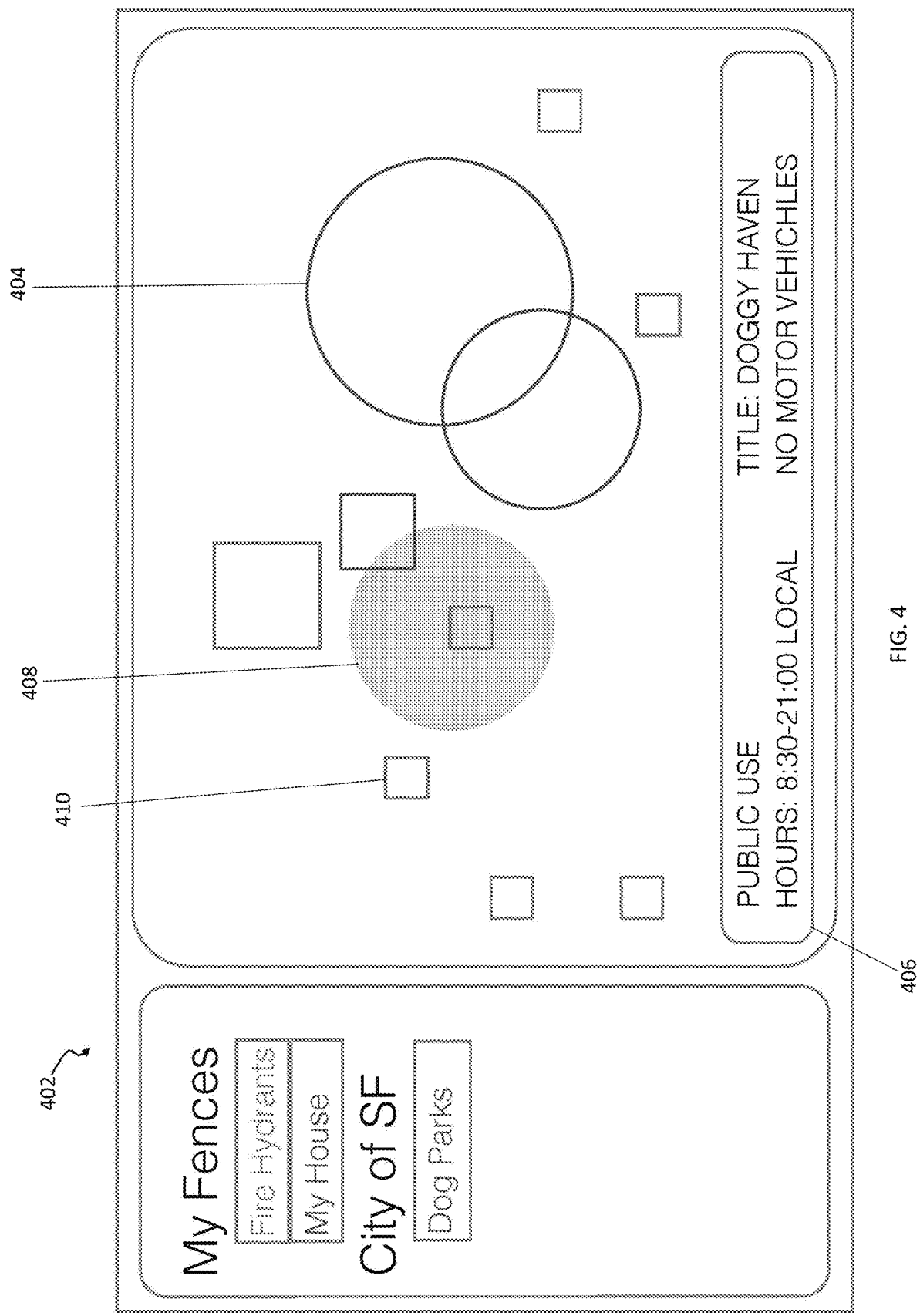
FIG. 4 illustrates one embodiment of a GUI for fence delivery network, including several options of defining a geofence, including defining the geofence by real property boundaries, defining the geofence by the radius around a beacon, defining the geofence by the perimeter of a building.

FIG. 4 illustrates one embodiment of a GUI for fence delivery network 402, including several options of defining a geofence, including defining the geofence by real property boundaries, defining the geofence by the radius around a beacon, defining the geofence by the perimeter of a building. By way of example and not limitation, a use case for identifying geofences associated with Dog Parks is shown, indicating the locations of the Dog Parks 404 based upon the City of SF, and public use hours and restrictions 406 are also indicated. Also illustrated are My Fences, which in this use case include the user's home geofence (My House) 408 and Fire Hydrants 410. All of these are automatically indicated with geographic proximity to each other and visually represented in 2-D map view on the GUI of the user's mobile device. Preferably, the geofences associated with Dog Parks, the user's home geofence, and the geofences associated with Fire Hydrants are each represented by a different color in the GUI, wherein the color is either the outline or partial of a geofence or the geofence is filled in with the color. In an exemplary embodiment, fire hydrants are represented with red, the home geofence is represented with blue, and the dog parks are represented with green. In another embodiment, the geofences associated with Dog Parks, the user's home geofence, and the geofences associated with Fire Hydrants are each represented by different figures. Preferably, each distinct type of fence is represented with a different shape and/or a different outline of the shape. In 4, the Dog Parks are represented by the two overlapping non-filled circles and the square partially overlapping the filled circle; My House is represented by the square above the filled circle which does not overlap the filled circle; and the Fire Hydrants are represented by the remainder of the squares.

Figure 5A:
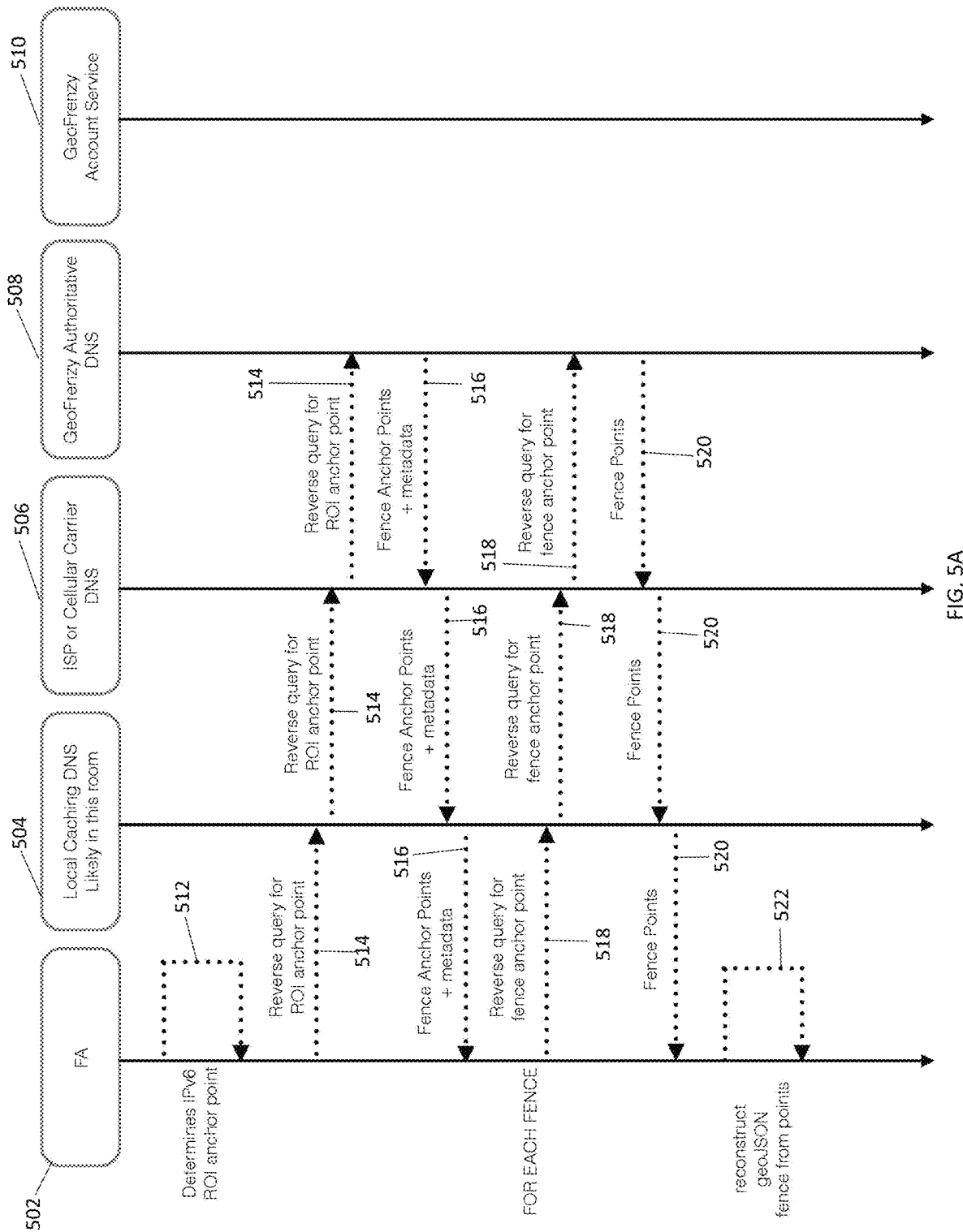
FIG. 5A shows a flowchart illustrating steps for querying a geofence database.
Figure 5B:
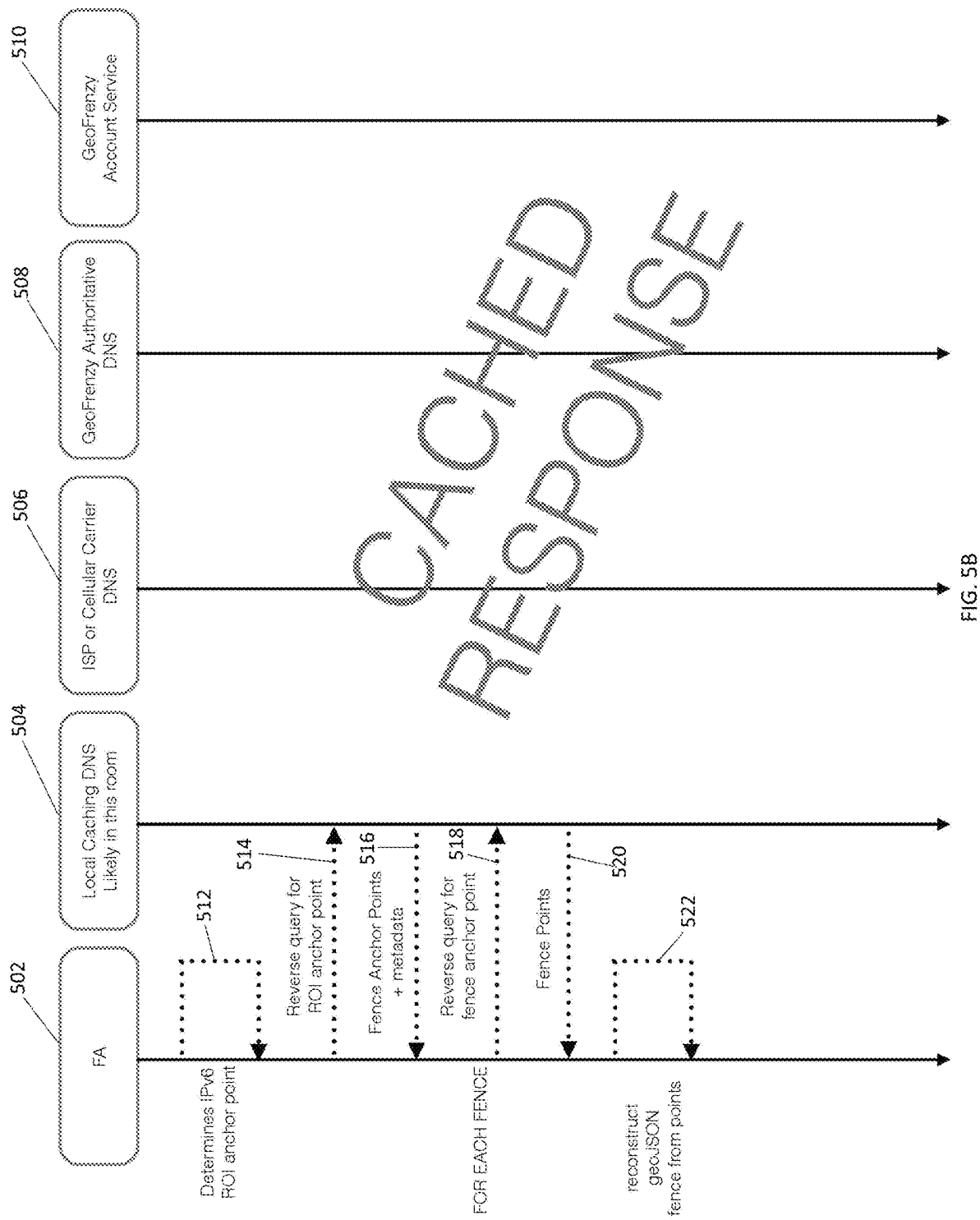
FIG. 5B shows a cached response for steps for querying a geofence database.

FIGS. 5A & 5B show a flowchart illustrating steps for querying a geofence database. The FIG. 5A flowchart includes an FA 502, a Local Caching DNS 504, an ISP or Cellular Carrier DNS 506, an Authoritative DNS 508, and an Authoritative Account Service 510. Steps include determines IPv6 ROI anchor point 512, Reverse query for ROI anchor point 514, Fence Anchor Points+metadata 516, Reverse query for fence anchor point 518, Fence Points 520, and reconstruct geoJSON fence from points 522. FIG. 5B is a cached response for steps for querying a geofence database.

Figure 6:
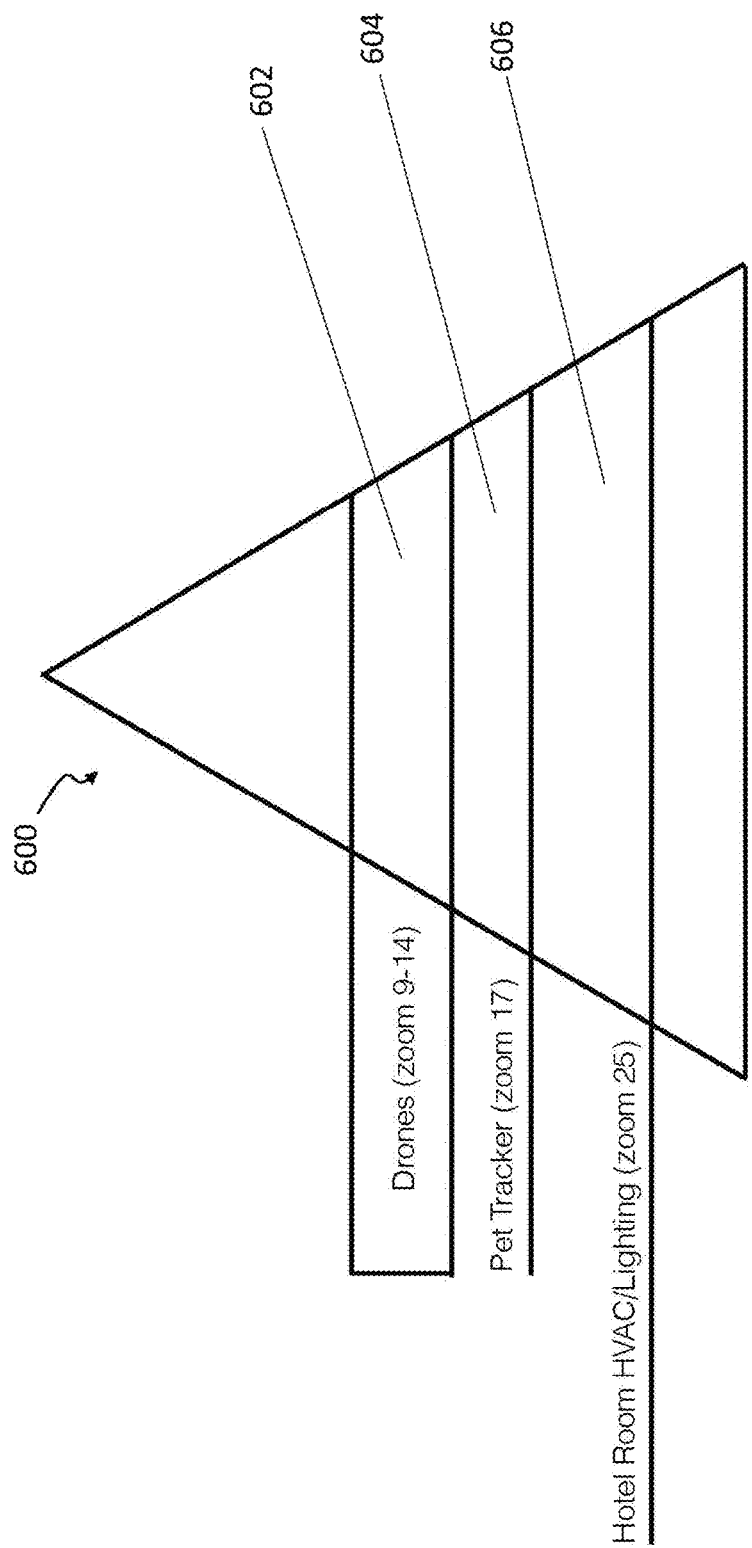
FIG. 6 is a diagram illustrating zoom level to class binding when using a pyramid projection.

FIG. 6 is a diagram illustrating zoom level to class binding when using a pyramid projection 600. As shown, Drones are provided on a zoom level 9-14 602; Pet Tracker is provided on a zoom level 17 604; and Hotel Room HVAC/Lighting is provided on a zoom level 25 606. In a current pyramid projection according to the present invention, the highest order bits of IP addresses are used to represent a location, and the lower order bits are used to express metadata such as fence classes, entitlements, and lookup table identifiers (for the purpose of redefining the metadata bits in the future). In other embodiments, the metadata are expressed on any aspect of DNS or IP, such as DNS RR (resource records), certificates, keys or IPv6 scopes. In a current pyramid projection according to the present invention, there are trillions of potential bits to be used as metadata in every square millimeter of location. These bits, when set to 1 will represent an intersection of class, entitlements and lookup table for this square centimeter location.

Figure 7:
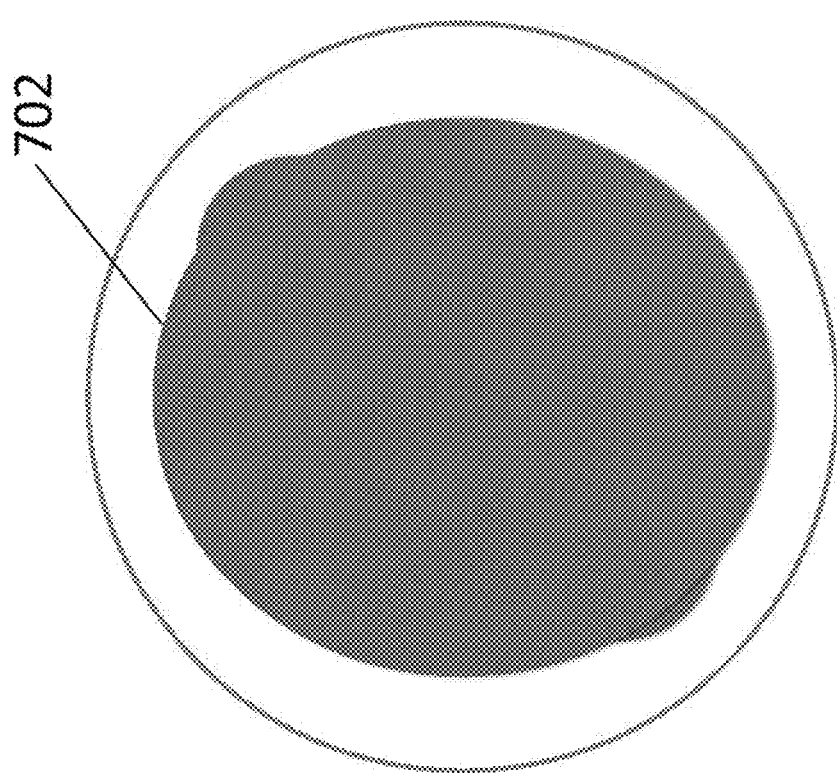
FIG. 7 illustrates a 3-D model overview illustrating the surface of the Earth is not a perfect sphere.

FIG. 7 illustrates a 3-D model overview illustrating how the surface of the Earth is not a perfect sphere 702; however, as provided by the present invention, a sphere map is generated automatically consisting of points that are represented by IPv6 addresses that superficially wrap around or cover the Earth such that the sphere map encompasses the highest features to represent or approximate the Earth's surface for use with the present invention generation of geofences registry, lookup, categorization within at least one database for geofences.

Figure 8:
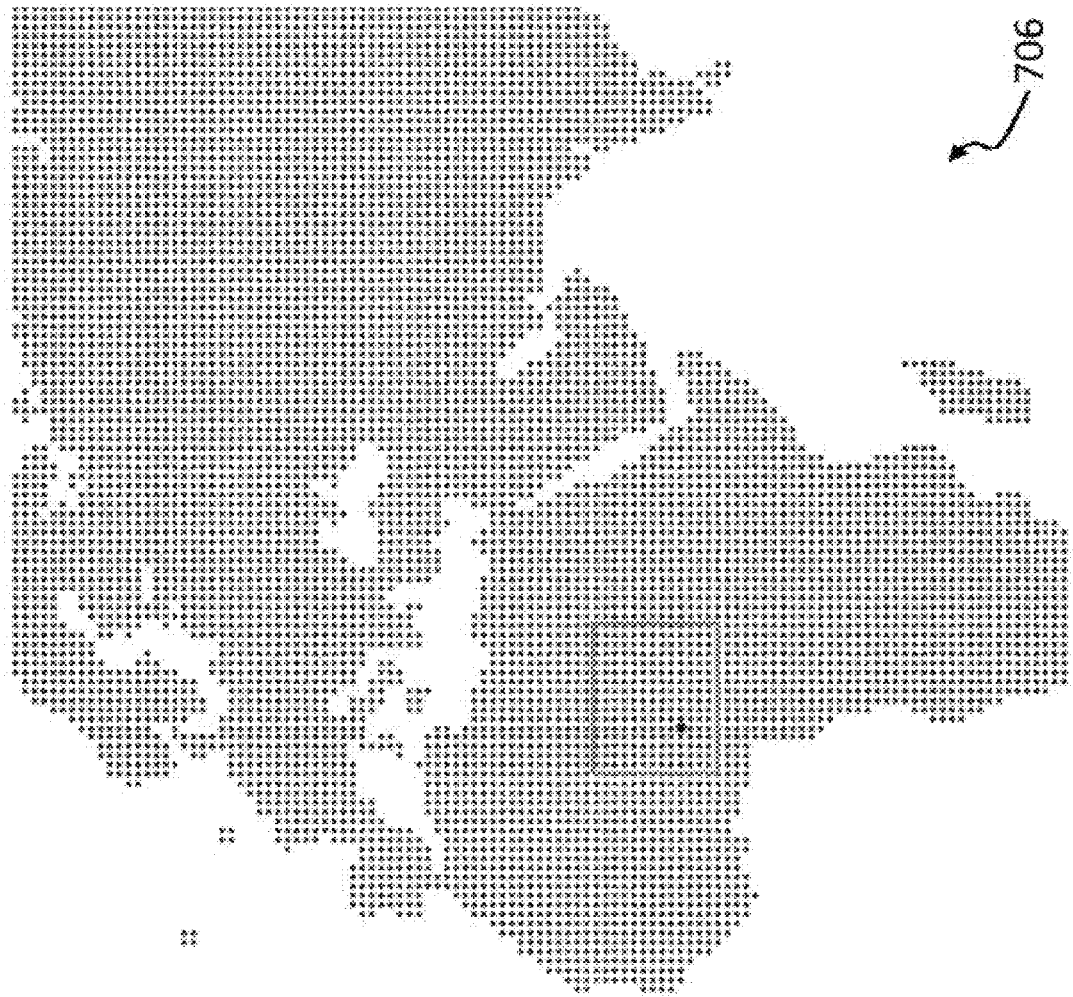
FIG. 8 is a 2-D model overview illustrating another view of mapping the earth for providing visualization of geofences according to one embodiment of the present invention.
Figure 8:

FIG. 8 is a 2-D model overview illustrating another view of mapping the earth 706 for providing visualization of geofences according to one embodiment of the present invention.

Figure 9:
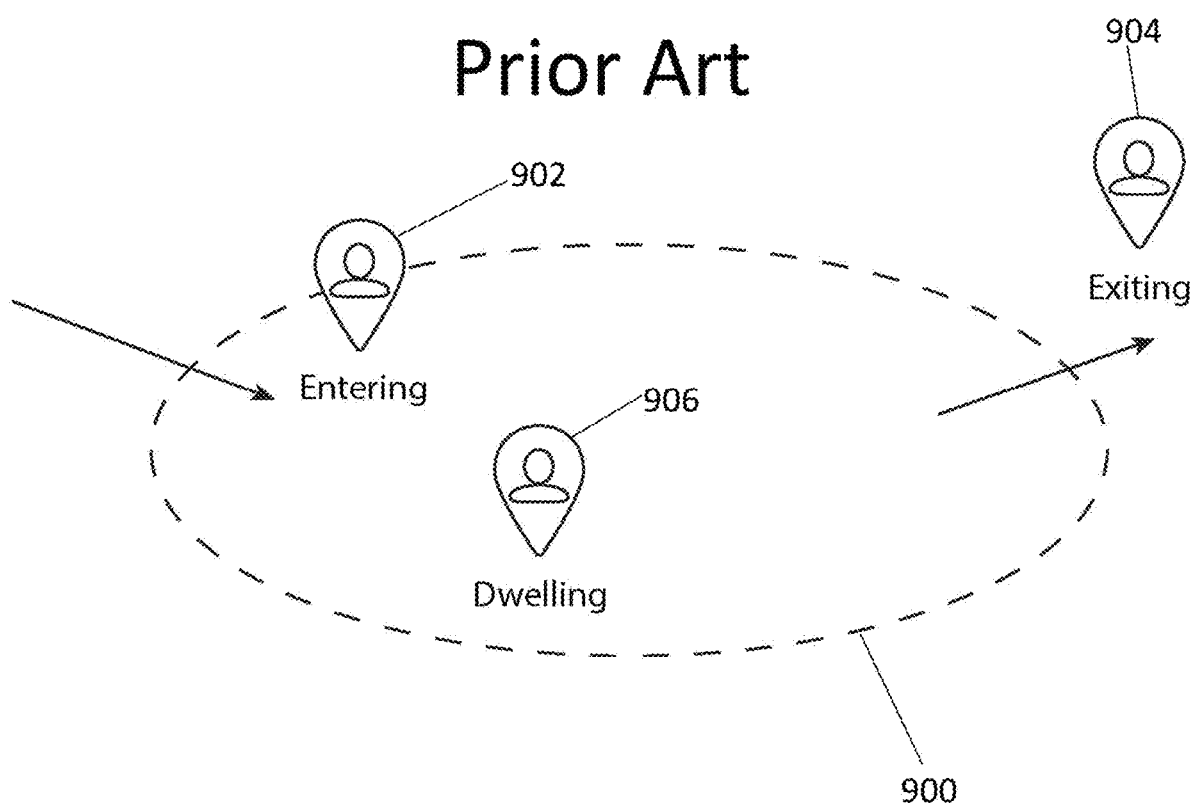
FIG. 9 is a PRIOR ART schematic diagram for geofencing solutions.

FIG. 9 is a PRIOR ART schematic diagram for geofencing solutions. Current prior art geofencing solutions are generally based on centroid fences and the data emitted by the location service frameworks consists of simple messages containing the fence identification (ID) and a notice of entry 902, exit 904, or dwelling 906 inside of the fence 900.

Figure 10:
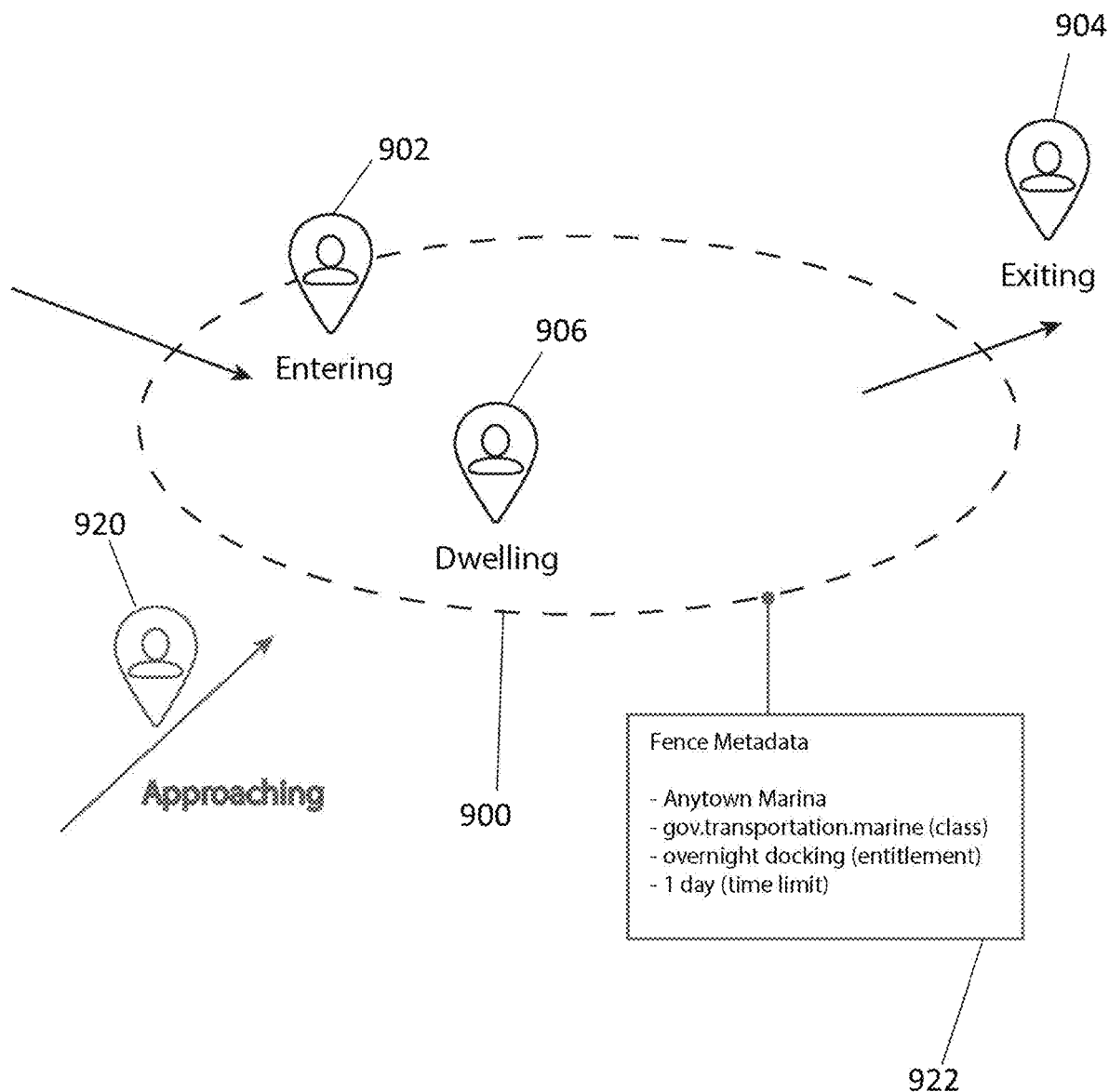
FIG. 10 is a schematic diagram for geofencing solutions according to one embodiment of the present invention.

FIG. 10 is a schematic diagram for geofencing solutions according to one embodiment of the present invention. By contrast and differentiation from prior art, the present invention provides for augmentation of messaging. The approaching 920, entering 902, exiting 904, and dwelling 906 messages are augmented with metadata describing the ownership and purpose of a geofence through a hierarchy of classes 922. The purpose of a geofence is defined to include the intended and/or allowed use of services inside or within the geofence boundaries, which are expressed through a system of entitlements that are received as inputs and stored in the at least one geofence database and associated with the geofence data.

FIG. 11 is a schematic diagram illustrating the encoding of a class and entitlement on an IPv6 address according to one embodiment of the present invention. While this illustration is oversimplified, its depiction of encoding of a class and entitlement on an IPv6 address is extended to provide for billions of positions per location. The lat/long point 1102 is the edge of a floating bit boundary; the dots 1104 represent the anchor points that the systems and methods of the present invention use for metadata rather than for location. The neighboring lat/long point 1105 is the next usable point under which the depicted and described process starts again (or repeats). Significantly, there is only one bit of metadata for each anchor point, but there are multiple points for each geofence, according to the present invention; this provides for and allows multiple classes and/or entitlements to be expressed and associated with each geofence. In the example case used for this FIG. 11, four example entitlements are illustrated: Notification 1106, Drone Landing 1108, Connect VPN 1110, and Camera 1112; they have corresponding colorized points, respectively: red, green, yellow, and blue. In FIG. 11, the possible entitlements are organized in lines of dots, with a darker dot indicating that the entitlement is allowed for that latitude and longitude. In another embodiment, the entitlements. The example case is provided for illustration purposes only and does not intend to limit the claimed invention thereto; the example case shows a user (Jenny/Jenny's Flowers) 1114 who would like to allow delivery drones to land for pickup and drop-off inside a predetermined geofence having an anchor point at lat/long as illustrated. Each point is a neighboring lat/long point; Owner 1 1116, Owner 2 1118, Bob's Tacos 1120, Jenny's Flowers 1114, and John Jones 1122 are all indicated in this example as geofence owners; Class 1 1124, Class 2 1126, Flower Shops 1128, and John's house 1130 are all indicated as geofence classes associated with the indicated example entitlements. The green point 1132 activated for Jenny's Flowers user/owner and for Flower Shops that allows for the entitlement of Drone Landing (green point 1132) is highlighted to indicate an intended or allowable use of that geofence by the geofence owner. The lighter dots surrounding the darker point represent prospective entitlements which have not been allowed for Notification, Drone Landing, Connect VPN, and Camera.

By way of definition and description supporting the claimed subject matter, preferably, the present invention includes communication methodologies for transmitting data, data packets, messages or messaging via a communication layer. Wireless communications over a network are preferred. Correspondingly, and consistent with the communication methodologies for transmitting data or messaging according to the present invention, as used throughout this specification, figures and claims, wireless communication is provided by any reasonable protocol or approach, by way of example and not limitation, Bluetooth, Wi-Fi, cellular, Zigbee, near field communication, and the like; the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard(s), the term "WiMAX" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMAX, other communications protocols may be used, including but not limited to a "1G" wireless protocol such as analog wireless transmission, first generation standards based (IEEE, ITU or other recognized world communications standard), a "2G" standards based protocol such as "EDGE or CDMA 2000 also known as 1xRTT", a 3G based standard such as "High Speed Packet Access (HSPA) or Evolution for Data Only (EVDO), any accepted 4G standard such as "IEEE, ITU standards that include WiMAX, Long Term Evolution "LTE" and its derivative standards, any Ethernet solution wireless or wired, or any proprietary wireless or power line carrier standards that communicate to a client device or any controllable device that sends and receives an IP based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments of the invention described herein may be comprised of one or more conventional processors and unique stored program instructions that control the one or more processors to implement, in conjunction with certain non-processor circuits, some, most, or all of the functions for the systems and methods as described herein. The non-processor circuits may include, but are not limited to, radio receivers, radio transmitters, antennas, modems, signal drivers, clock circuits, power source circuits, relays, current sensors, and user input devices. As such, these functions may be interpreted as steps of a method to distribute information and control signals between devices. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Certain modifications and improvements will occur to those skilled in the art upon a reading of the foregoing description. In an alternate embodiment of the systems and methods of the present invention, Lat/Long is used and forward records instead of using IP addresses as described in the foregoing preferred embodiments. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for aerial vehicle registration, comprising:
a server computer and at least one database constructed and configured for network communication with at least one aerial vehicle;
wherein the at least one aerial vehicle transmits a registration request to the server computer;
wherein the server computer assigns a unique registration identification (ID) to each of the at least one aerial vehicle;
wherein the at least one database stores registration data of the at least one aerial vehicle;
wherein the at least one database comprises a geofence database storing information of a multiplicity of registered geofences;
wherein each of the multiplicity of registered geofences comprises a plurality of geographic designators defined by a plurality of unique Internet Protocol version 6 (IPv6) addresses such that each geographic designator corresponds to a unique IPv6 address;
wherein one of the plurality of unique IPv6 addresses is encoded as a unique identifier for each of the multiplicity of registered geofences;
wherein the unique identifier for each of the multiplicity of registered geofences comprises a location data portion and a metadata portion, wherein the metadata portion comprises at least one rule, and wherein the at least one rule includes behavior information for the at least one aerial vehicle approaching, entering, or occupying the airspace of a geofence; and
wherein the server computer caches the information of the multiplicity of registered geofences on the at least one aerial vehicle.

2. The system of claim 1, wherein the at least one aerial vehicle registers at the server computer periodically.

3. The system of claim 1, wherein the at least one aerial vehicle comprises a software-defined Multi-Band Spatial Broadcast (MBSB) transponder.

4. The system of claim 3, wherein the software-defined MBSB transponder broadcasts information including the registration ID, position information, and position certainty information.

5. The system of claim 1, wherein the at least one aerial vehicle broadcasts battery life information, and command and control state based on Automatic Dependent Surveillance-Broadcast (ADS-B) technology.

6. The system of claim 1, wherein the at least one aerial vehicle creates a mobile geofence with a predetermined safety perimeter around the at least one aerial vehicle.

7. The system of claim 1, wherein the at least one aerial vehicle detects a mobile geofence of another aerial vehicle and activate automated collision avoidance rules within predetermined safety parameters when approaching the mobile geofence of another aerial device.

8. The system of claim 1, wherein the at least one rule includes encrypted authorization information for cross-border operations of the at least one aerial vehicle.

9. The system of claim 1, wherein the at least one aerial vehicle includes manned and/or unmanned aerial devices.

10. The system of claim 1, further comprising at least one mobile device constructed and configured for network communication with the server computer, wherein the at least one mobile device registers at least one geofence on the server computer.

11. The system of claim 1, wherein the server computer caches the information of the multiplicity of registered geofences on edge servers and routers via a global Fence Delivery Network.

12. A system for aerial vehicle registration, comprising:
a server computer and at least one database constructed and configured for network communication with at least one aerial vehicle and at least one user device;
wherein the at least one aerial vehicle transmits a registration request to the server computer;
wherein the server computer assigns a unique registration identification (ID) for the at least one aerial vehicle;
wherein the at least one database stores registration data of the at least one aerial vehicle;
wherein the at least one user device registers at least one geofence on the server computer;
wherein the at least one database stores information of the at least one geofence;
wherein each of the at least one geofence comprises a plurality of geographic designators defined by a plurality of unique Internet Protocol version 6 (IPv6) addresses;
wherein one of the plurality of unique IPv6 addresses is encoded as a unique identifier for each of the at least one geofence;
wherein the unique identifier for each of the at least one geofence comprises a location data portion and a metadata portion, wherein the metadata portion comprises at least one rule, and wherein the at least one rule includes behavior information for the at least one aerial vehicle approaching, entering, or occupying the airspace of a geofence; and
wherein the server computer caches the information of the at least one geofence on the at least one aerial vehicle.

13. The system of claim 12, wherein the at least one aerial vehicle comprises a Multi-Band Spatial Broadcast (MBSB) beacon broadcasting information including the registration ID, position information, and position certainty information.

14. A method for aerial vehicle registration, comprising:
providing a server computer and at least one database constructed and configured for network communication with at least one aerial vehicle;
the at least one aerial vehicle transmitting a registration request to the server computer;
the server computer assigning a unique registration identification (ID) to the at least one aerial vehicle;
the at least one database storing registration data of the at least one aerial vehicle;
the server computer caching information of a multiplicity of registered geofences on the at least one aerial vehicle, wherein the at least one database comprises a geofence database storing the information of the multiplicity of registered geofences, wherein each of the multiplicity of registered geofences comprises a plurality of geographic designators defined by a plurality of unique Internet Protocol version 6 (IPv6) addresses, wherein one of the plurality of unique IPv6 addresses is encoded as a unique identifier for each of the multiplicity of registered geofences; and
the unique identifier for each of the multiplicity of registered geofences comprising a location data portion and a metadata portion, wherein the metadata portion comprises at least one rule, and wherein the at least one rule includes behavior information for the at least one aerial vehicle approaching, entering, or occupying the airspace of a geofence.

15. The method of claim 14, further comprising at least one mobile device registering at least one geofence on the server computer via network communication.

16. The method of claim 14, further comprising the at least one aerial vehicle broadcasting information including the registration ID, position information, position certainty information, battery life information, and command and control state.

17. The method of claim 14, further comprising the at least one aerial vehicle detecting a mobile geofence of another aerial vehicle and activating automated collision avoidance rules within predetermined safety parameters when approaching a mobile geofence of another aerial device.

* * * * *